United States Patent
Nishihara

(10) Patent No.: US 11,267,241 B2
(45) Date of Patent: Mar. 8, 2022

(54) IMAGE FORMING APPARATUS AND METHOD FOR CONTROLLING IMAGE FORMING APPARATUS

(71) Applicant: KYOCERA Document Solutions Inc., Osaka (JP)

(72) Inventor: Masaaki Nishihara, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 21 days.

(21) Appl. No.: 16/900,379

(22) Filed: Jun. 12, 2020

(65) Prior Publication Data
US 2020/0398555 A1 Dec. 24, 2020

(30) Foreign Application Priority Data
Jun. 18, 2019 (JP) .............................. JP2019-113110

(51) Int. Cl.
*B41J 2/045* (2006.01)
*B41J 2/155* (2006.01)

(52) U.S. Cl.
CPC ....... *B41J 2/04505* (2013.01); *B41J 2/04586* (2013.01); *B41J 2/155* (2013.01)

(58) Field of Classification Search
CPC ..... B41J 2/04505; B41J 2/04586; B41J 2/155
See application file for complete search history.

(56) References Cited

U.S. PATENT DOCUMENTS

| 10,155,322 B2* | 12/2018 | Egawa ................. B26D 5/34 |
| 2009/0166960 A1 | 7/2009 | Ishikawa et al. ............ 271/227 |
| 2017/0232765 A1 | 8/2017 | Moriyama et al. | |
| 2018/0170699 A1 | 6/2018 | Yamasaki | |

FOREIGN PATENT DOCUMENTS

| EP | 3 335 891 A1 | 6/2018 |
| JP | 4-181110 A | 6/1992 |
| JP | 2004-18194 A | 1/2004 |
| JP | 2012-90085 A | 5/2012 |

OTHER PUBLICATIONS

European Office Action dated Oct. 15, 2020, issued by the European Patent Office in corresponding application EP 20179624.0.

* cited by examiner

*Primary Examiner* — Thinh H Nguyen
(74) *Attorney, Agent, or Firm* — Stein IP, LLC

(57) ABSTRACT

An image forming apparatus includes a sheet feeder, a sheet conveyor, a line head, an image sensor, a moving mechanism, and a controller. The image sensor has a reading width in the main scanning direction smaller than main scanning direction widths of a largest printable size paper sheet. In setting for using a large width sheet, a controller controls a moving mechanism to move the image sensor toward one side so that a one side edge of the large width sheet can be read. Based on read image data obtained by reading, the controller recognizes a deviation direction and a deviation amount of a position of the conveyed large width sheet in the main scanning direction.

15 Claims, 10 Drawing Sheets

IMAGE FORMING APPARATUS AND METHOD FOR CONTROLLING IMAGE FORMING APPARATUS

INCORPORATION BY REFERENCE

This application is based upon and claims the benefit of priority from the corresponding Japanese Patent Application No. 2019-113110 filed Jun. 18, 2019, the entire contents of which are hereby incorporated by reference.

BACKGROUND

The present disclosure relates to an image forming apparatus that reads a paper sheet conveyed for printing.

There is an apparatus that reads a paper sheet using an image sensor. For instance, it is an image forming apparatus such as a multifunction peripheral or a printer. Image data is generated based on an analog image signal output from an image sensor. Further, the image sensor may be used for obtaining information about the paper sheet. There is known a following device that uses an image sensor for detecting a size of a paper sheet.

Specifically, there is known a following document reader device. A set document is automatically conveyed. A read unit including a plurality of photoelectric conversion elements arranged in a main scanning direction reads a first area of the conveyed document, and reads a second area different from the first area. The device includes an edge guide that is slidable so as to guide an edge of the automatically conveyed document in a conveying direction, an interlocking mechanism that mechanically interlocks with sliding of the edge guide, and a displacement member that is attached to the interlocking mechanism and moves along with interlocking of the interlocking mechanism so as to change its position on the second area. The device stores a correspondence between size information and output patterns of the plurality of elements for each document size, and determines a size of the document based on output patterns of the plurality of elements obtained by reading the second area and the correspondence. Thus, a size of the document is determined.

A position of the conveyed paper sheet (the paper sheet used for printing) in the main scanning direction may be deviated from an ideal position. In order to detect a degree of the deviation, the image sensor reads the conveyed paper sheet. On the basis of a result of reading, an edge of the paper sheet (a position of a side edge) is detected, so that a degree of the deviation can be determined. For instance, on the basis of a result of detection, it is possible to prevent ink ejection to a part where the paper sheet does not exist.

When reading the conveyed paper sheet, conventionally, the image sensor is used, which has a reading width in the main scanning direction larger than a main scanning direction width of the paper sheet of a largest printable size. In other words, conventionally, the image sensor that reads the entire area of the paper sheet of the largest size is used. In this way, it is possible to recognize both end edge positions of the conveyed paper sheet of any size.

However, as the reading width is larger (longer), the image sensor is more expensive. A common image sensor available in the market may be smaller in the length, and a custom-made sensor may be necessary. When detecting edges of the conveyed paper sheet in the main scanning direction, it is necessary to use an expensive image sensor having a large reading width, which causes a problem that a production cost of the image forming apparatus is increased.

In the above-mentioned known technique, a document that is conveyed is read. On the basis of obtained image data, printing or transmission is performed. In order to enable to read the document even if a document position is deviated a little, it is necessary to use an image sensor having a reading width larger than a main scanning direction width of the document of a largest readable size. Accordingly, it cannot solve the problem described above.

SUMMARY

An image forming apparatus according to the present disclosure includes a sheet feeder, a sheet conveyor, a line head, an image sensor, a moving mechanism, and a controller. The sheet feeder feeds a paper sheet. The sheet conveyor conveys the paper sheet fed from the sheet feeder. The line head includes a plurality of nozzles aligned in a main scanning direction perpendicular to a sheet conveying direction. The line head ejects ink for printing from the nozzles to the conveyed paper sheet. The image sensor is disposed on an upstream side of the line head in the main scanning direction. The image sensor reads the conveyed paper sheet in the main scanning direction. The image sensor has a reading width in the main scanning direction, smaller than main scanning direction widths of some paper sheets out of printable size paper sheets. The moving mechanism includes a moving motor. The moving mechanism moves the image sensor in the main scanning direction. In setting for using a large width sheet having a main scanning direction width larger than the reading width, the controller controls the moving mechanism to move the image sensor from a predetermined reference position toward one side in the main scanning direction, so that an edge on the one side out of edges of the large width sheet can be read. On the basis of read image data obtained by reading by the image sensor, the controller recognizes a deviation direction and a deviation amount of a position of the conveyed large width sheet in the main scanning direction.

A method for controlling an image forming apparatus according to the present disclosure includes: feeding a paper sheet; conveying the fed paper sheet; using a line head including a plurality of nozzles aligned in a main scanning direction perpendicular to a sheet conveying direction, so as to print by ejecting ink from the nozzles to the conveyed paper sheet; disposing an image sensor on an upstream side of the line head in the sheet conveying direction; using the image sensor to read the conveyed paper sheet in the main scanning direction; setting a reading width of the image sensor in the main scanning direction smaller than main scanning direction widths of some paper sheets out of printable size paper sheets; moving the image sensor in the main scanning direction; moving the image sensor from a predetermined reference position toward one side in the main scanning direction, so that an edge on the one side out of edges of the large width sheet can be read, in setting for using a large width sheet having a main scanning direction width larger than the reading width; and recognizing a deviation direction and a deviation amount of a position of the conveyed large width sheet in the main scanning direction, on the basis of read image data obtained by reading by the image sensor.

Other features and advantages of the present invention will become more apparent from the description of the embodiment given below.

DETAILED DESCRIPTION

The present disclosure enables to precisely recognize position deviation of a paper sheet in a main scanning direction even using an inexpensive image sensor having a small reading width. Hereinafter, with reference to FIGS. 1 to 12, an embodiment of the present disclosure is described. After describing the embodiment, a variation will be described. An image forming apparatus 100 performs printing using ink. In the following description, a printer is exemplified and described as the image forming apparatus 100. Note that the image forming apparatus 100 may also be a multifunction peripheral, for example.

Outline of Image Forming Apparatus 100

Figure 1:
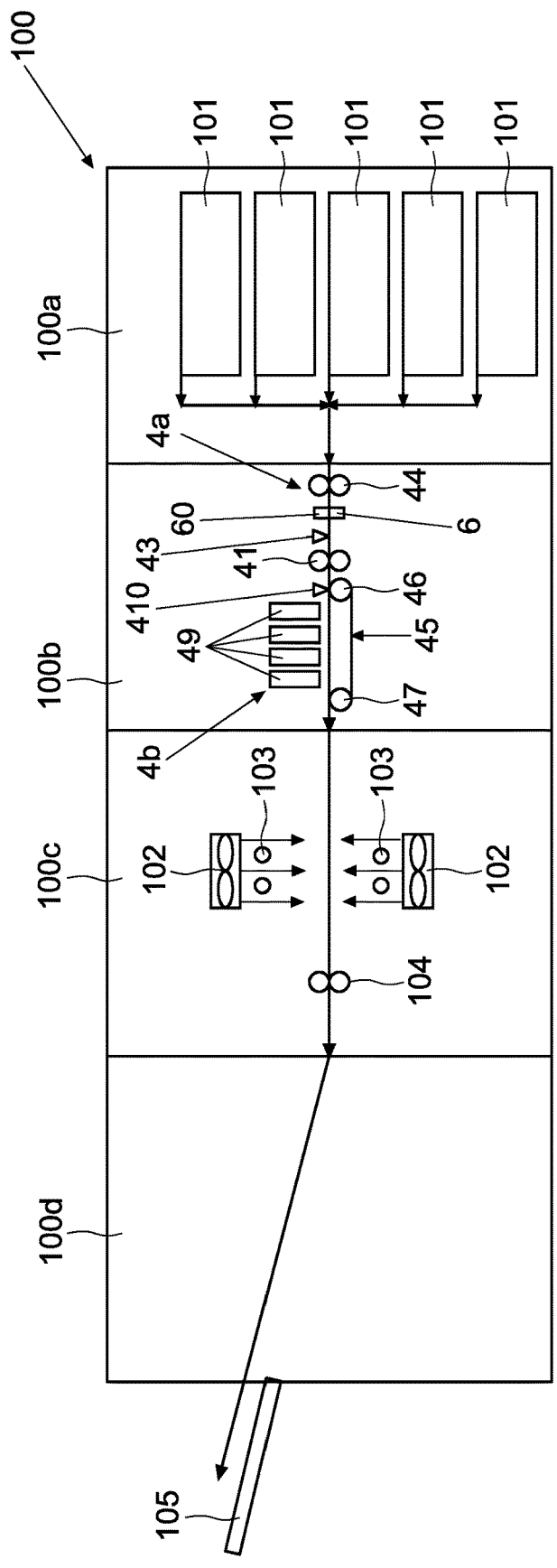
FIG. 1 is a diagram illustrating one example of an image forming apparatus according to an embodiment.
Figure 2:
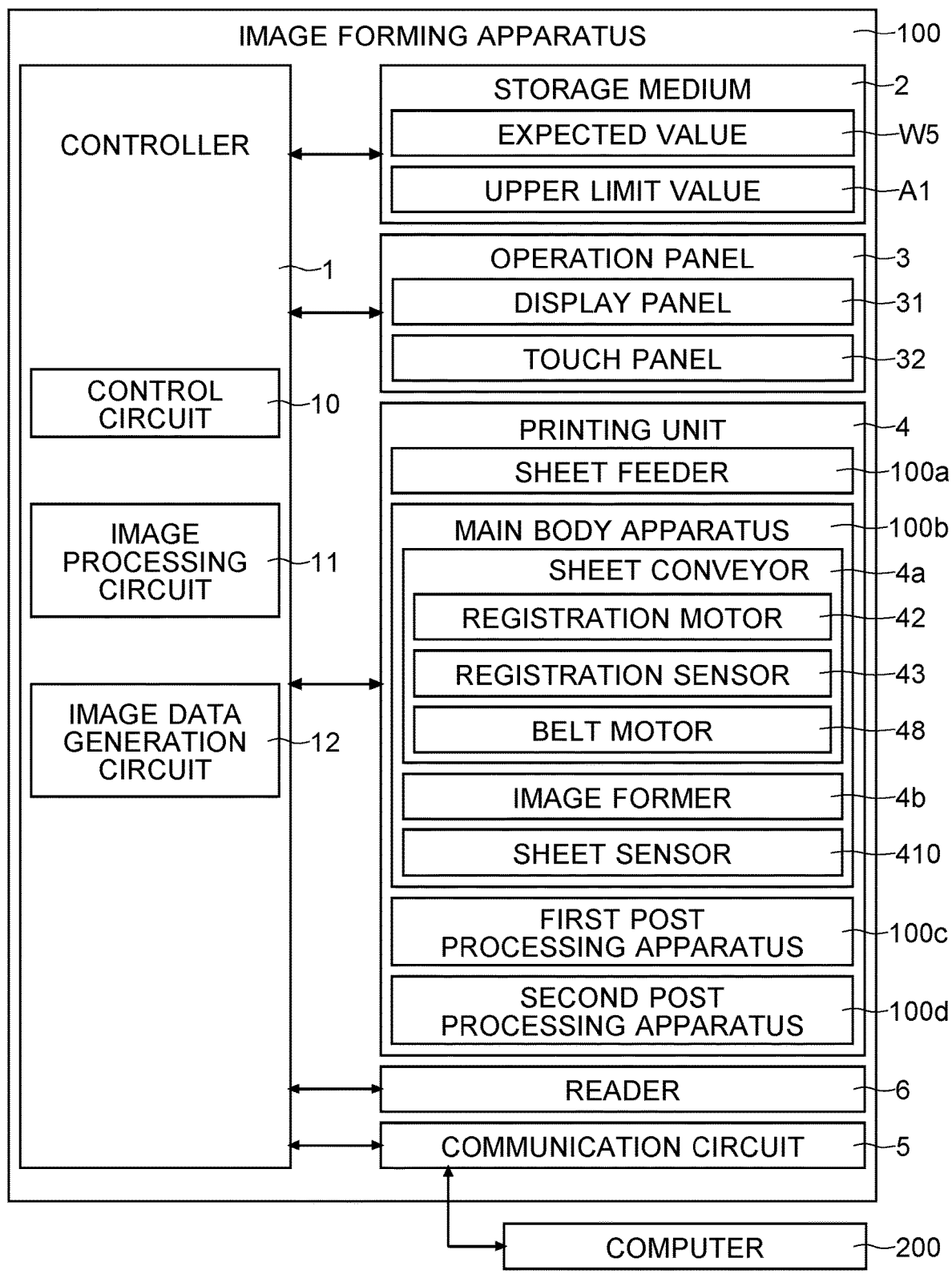
FIG. 2 is a diagram illustrating one example of the image forming apparatus according to the embodiment.

First, with reference to FIGS. 1 and 2, an outline of the image forming apparatus 100 according to the embodiment is described. As illustrated in FIG. 1, the image forming apparatus 100 includes a sheet feeder 100a, a main body apparatus 100b, a first post processing apparatus 100c, and a second post processing apparatus 100d. In FIG. 1, a solid line arrow indicates a sheet conveying direction. The sheet feeder 100a and the main body apparatus 100b are coupled (connected) to each other. The main body apparatus 100b and the first post processing apparatus 100c are coupled (connected) to each other. The first post processing apparatus 100c and the second post processing apparatus 100d are coupled (connected) to each other.

The sheet feeder 100a includes a plurality of sheet feed cassettes 101. Each of the sheet feed cassettes 101 stores paper sheets. When printing is performed, a paper sheet is fed from one of the sheet feed cassettes 101. One sheet feed roller is provided to one sheet feed cassette 101. When printing is performed, the sheet feed roller for feeding the paper sheet of the sheet feed cassette 101 rotates. The sheet feeder 100a conveys the fed paper sheet toward the main body apparatus 100b.

The main body apparatus 100b performs printing on the paper sheet. The main body apparatus 100b performs printing using ink. The first post processing apparatus 100c is an apparatus for performing drying of the paper sheet and decurling (removing curling) of the same. For drying ink, the first post processing apparatus 100c includes a fan 102 and a heater 103. The fan 102 blows air to the paper sheet printed by the main body apparatus 100b. The heater 103 heats air blown to the paper sheet. In this way, ink can be dried. Further, the first post processing apparatus 100c includes a decurl roller pair 104. The decurl roller pair 104 applies pressure to the paper sheet. The second post processing apparatus 100d discharges the paper sheet onto a discharge tray 105. The second post processing apparatus 100d can reverse front and back sides of the paper sheet so that the printed side faces down.

As illustrated in FIG. 2, the image forming apparatus 100 includes a controller 1, a storage medium 2, an operation panel 3, a printing unit 4, and a communication circuit 5. The controller 1, the storage medium 2, the operation panel 3, and the communication circuit 5 are disposed in the main body apparatus 100b. The controller 1 controls individual units of the image forming apparatus 100. The controller 1 is a circuit board including a control circuit 10, an image processing circuit 11, and an image data generation circuit 12. For instance, the control circuit 10 is a CPU. The control circuit 10 performs calculation and processing based on a control program and control data stored in the storage medium 2. The image forming apparatus 100 includes a nonvolatile storage device such as a ROM and a storage (an HDD or a flash ROM), as the storage medium 2. Further, the image forming apparatus 100 includes a volatile storage device such as a RAM, as the storage medium 2. The image processing circuit 11 performs image processing of image data to be used for printing. The image processing circuit 11 generates ink ejection image data 90.

The operation panel 3 includes a display panel 31 and a touch panel 32. The controller 1 controls the display panel 31 to display setting screens and information. The display panel 31 displays operation images such as keys, buttons, and tabs. The touch panel 32 detects a touch operation on the display panel 31. On the basis of an output of the touch panel 32, the controller 1 recognizes an operation image that is operated. The controller 1 recognizes a setting operation made by a user.

The printing unit 4 includes the sheet feeder 100a, a part of the main body apparatus 100b, the first post processing apparatus 100c, and the second post processing apparatus 100d. The main body apparatus 100b includes a sheet conveyor 4a and an image former 4b as the printing unit 4. When executing a print job, the controller 1 controls an operation of the printing unit 4.

The operation panel 3 receives selection of the sheet feed cassette 101 to be used for printing. In the print job, the controller 1 rotates the sheet feed roller of the selected sheet feed cassette 101. Further, the controller 1 allows the paper sheet to enter the sheet conveyor 4a of the main body apparatus 100b. The sheet conveyor 4a conveys the paper sheet toward the image former 4b. As illustrated in FIGS. 1 and 2, in a conveying path of the sheet conveyor 4a, there are disposed a reader 6, a registration sensor 43, a registration roller pair 41, and a head 49 in order from an upstream side in the sheet conveying direction. A registration motor 42 is disposed for rotating the registration roller pair 41. The controller 1 controls rotation of the registration motor 42 so as to control rotation of the registration roller pair 41.

The main body apparatus 100b includes a registration sensor 43. The registration sensor 43 is disposed on the upstream side of the registration roller pair 41 in the sheet conveying direction. An output level of the registration sensor 43 varies depending on whether the paper sheet is detected or not. An output of the registration sensor 43 is input to the controller 1. On the basis of the output of the registration sensor 43, the controller 1 recognizes that a front end of the paper sheet has reached the registration sensor 43. Further, the controller 1 recognizes that a rear end of the paper sheet has passed the registration sensor 43.

At a time point when the paper sheet reaches the registration roller pair 41, the controller 1 keeps the registration roller pair 41 stopped. For instance, when the rear end of the previous paper sheet passes the registration sensor 43, the controller 1 stops the registration roller pair 41. On the other hand, the controller 1 rotates a conveying roller pair 44 next to and on the upstream side of the registration roller pair 41. The front end of the paper sheet abuts against the registration roller pair 41. The abutting paper sheet bends, and the front end of the paper sheet abuts against a nip of the registration roller pair 41. A skew of the paper sheet is corrected. After recognizing that the front end of the paper sheet has reached on the basis of the output of the registration sensor 43, when a predetermined bending formation time elapses, the controller 1 rotates the registration roller pair 41. In this way, the paper sheet is sent out to a conveyor belt 45.

The conveyor belt 45 is stretched around a drive roller 46 and a driven roller 47. A belt motor 48 is provided for rotating the drive roller 46. During the print job, the controller 1 controls the belt motor 48 to rotate, so that the conveyor belt 45 circulates. Note that the conveyor belt 45 sucks the paper sheet. A plurality of through holes are formed in the conveyor belt 45. For instance, a sucking device is disposed for sucking air through the through holes. A position of the paper sheet during printing can be fixed by the sucking operation.

The image former 4b performs printing on the conveyed paper sheet. In other words, the image former 4b ejects ink to the conveyed paper sheet so as to record an image. As illustrated in FIGS. 1 and 2, the image former 4b includes four line heads 49. In the line heads 49, one head ejects black ink, another head ejects yellow ink, another head ejects cyan ink, and another head ejects magenta ink. The line heads 49 are secured. The line heads 49 are disposed above the conveyor belt 45. A certain gap is formed between the conveyor belt 45 and the line heads 49. The paper sheet passes through this gap.

The line head 49 includes a plurality of nozzles. The nozzles are aligned in a direction perpendicular to the sheet conveying direction (in the main scanning direction) (in the direction perpendicular to the paper of FIG. 1). An opening of each nozzle faces the conveyor belt 45. The controller 1 supplies ink ejection image data 90 for printing to the line head 49. On the basis of the ink ejection image data 90, the line head 49 ejects ink from the nozzles to the conveyed paper sheet. The ink lands on the conveyed paper sheet. In this way, an image is recorded (formed).

A sheet sensor 410 is disposed on the upstream side of the line head 49. The sheet sensor 410 detects reaching of the front end of the paper sheet and passing of the rear end of the same. The sheet sensor 410 is a sensor for determining a timing of starting to print a page. An output of the sheet sensor 410 is input to the controller 1. On the basis of the output of the sheet sensor 410, the controller 1 recognizes that the front end of the paper sheet has reached the sheet sensor 410. After recognizing that the front end has reached, when a predetermined wait time elapses, the controller 1 controls the line heads 49 to start ink ejection (drawing) of a first line. The wait time is determined for each line head 49. For instance, the wait time is a time obtained by dividing a distance between a paper sheet detection position of the sheet sensor 410 and the nozzle of the line head 49 by a sheet conveying speed in the specification.

The controller 1 is connected to the communication circuit 5. The communication circuit 5 includes a communication connector, a communication control circuit, and a communication memory. The communication memory stores communication software. The communication circuit 5 communicates with a computer 200. For instance, the computer 200 is a PC or a server. The controller 1 receives print data from the computer 200. The print data includes print setting and print content. For instance, the print data includes data described in a page description language. The controller 1 (the image processing circuit 11) analyzes the received (input) print data. On the basis of the received print data, the controller 1 generates image data (raster data).

Reader 6

Figure 3:
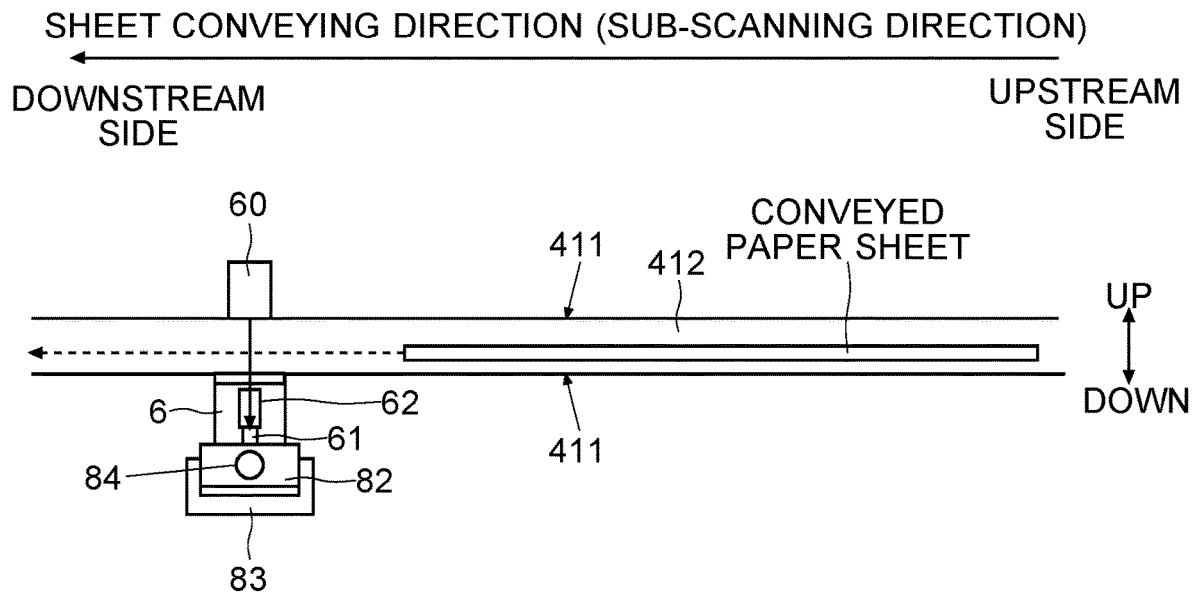
FIG. 3 is a diagram illustrating one example of a reader according to the embodiment.
Figure 4:
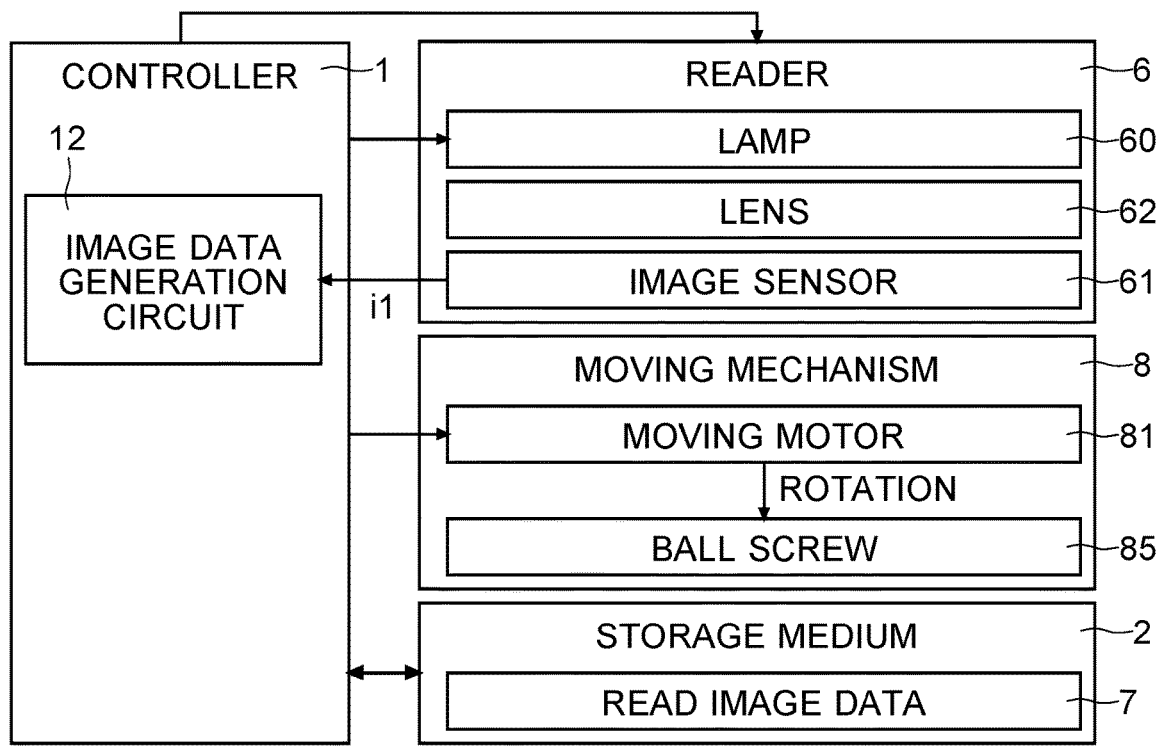
FIG. 4 is a diagram illustrating one example of the reader according to the embodiment.

Next, with reference to FIGS. 1 to 4, one example of the reader 6 according to the embodiment is described. As illustrated in FIG. 1, the reader 6 is disposed on the upstream side of the most upstream line head 49, the registration roller pair 41, and the registration sensor 43 in the sheet conveying direction. FIG. 1 illustrates an example in which the reader 6 (an image sensor 61) is disposed between the conveying roller pair 44 and the registration sensor 43. The reader 6 reads the conveyed paper sheet. As illustrated in FIGS. 3 and 4, the reader 6 includes the image sensor 61 for reading. The image sensor 61 is a line sensor. The image sensor 61 includes a plurality of light receiving elements. The plurality of light receiving elements are aligned in the main scanning direction (the direction perpendicular to the paper of FIG. 3). The image sensor 61 reads the conveyed paper sheet in the main scanning direction. The controller 1 controls the image sensor 61 to repeat reading in the main scanning direction. For instance, reading resolution of the image sensor 61 is the same as printing resolution of the line head 49.

In the image forming apparatus 100, as a part of the sheet conveyor 4a, a sheet conveying path 412 is constituted of a conveyor guide 411. For instance, the reader 6 is disposed below the sheet conveying path 412. A lamp 60 is disposed at a position facing an upper surface of the reader 6. The lamp 60 emits light along the main scanning direction. The lamp 60 emits light toward the sheet conveying path 412 and the upper surface of the reader 6 (in a downward direction in FIG. 3). The lamp 60 emits light so that the light passes across the sheet conveying path 412 in the up and down direction. The conveyed paper sheet blocks an optical path of the lamp 60.

The upper surface of the reader 6 transmits the light. For instance, the upper surface of the reader 6 is a glass plate or a transparent resin plate. A lens 62 (rod lens array) and the image sensor 61 are disposed in the reader 6. The light from the lamp 60 passes through the lens 62 and enters the image sensor 61. The reader 6 is a CIS type reading unit 6.

The image sensor 61 outputs charges accumulated in the light receiving elements as an analog image signal i1. The image sensor 61 outputs the analog image signal i1 every time when reading one line. The output of the image sensor 61 is input to the controller 1 (the image data generation circuit 12). The image data generation circuit 12 performs A/D conversion of the analog image signal i1 and generates read image data 7. The image data generation circuit 12 repeats the generation of the read image data 7 by line. The controller 1 controls the storage medium 2 to store the generated read image data 7.

When the paper sheet does not exist between the lamp 60 and the reader 6 (the image sensor 61), the light from the lamp 60 enters the image sensor 61. When the paper sheet exists between the lamp 60 and the reader 6, the light from the lamp 60 is blocked by the paper sheet. Therefore, the read image data 7 outputs dark (black or high density) pixel values for pixels obtained by reading the paper sheet (pixels in a part where the paper sheet exists). On the contrary, it outputs light (white or low density) pixel values for pixels in a part where the paper sheet does not exist. On the basis of a position of a boundary between the high density pixels and the low density pixels, the controller 1 can recognize a position of an edge Eg (side edge) of the conveyed paper sheet in the main scanning direction.

Movement of Image Sensor 61

Next, with reference to FIGS. 3 and 4, one example of movement of the image sensor 61 according to the embodiment is described. The image forming apparatus 100 includes a moving mechanism 8. The moving mechanism 8 moves the image sensor 61 in the main scanning direction. The moving mechanism 8 includes a moving motor 81 as a drive source for moving the image sensor 61. The moving motor 81 can rotate in both forward and reverse directions. As illustrated in FIG. 3, the moving mechanism 8 includes a slide table 82 and a slide guide 83.

The slide guide 83 has a U-shaped cross section. The slide guide 83 guides movement of the slide table 82. The reader 6 is secured to the slide table 82. A lower surface of the reader 6 and an upper surface of the slide table 82 contact with each other. The slide table 82 moves in the main scanning direction. The slide table 82 includes a nut 84. A ball screw 85 is inserted through the nut 84. Note that the ball screw 85 is not shown in FIG. 3. As illustrated in FIG. 4, the moving motor 81 rotates the ball screw 85. When moving the image sensor 61, the controller 1 controls the moving motor 81 to rotate. As a result, the ball screw 85 rotates, and the reader 6 moves together with the slide table 82. The rotation of the moving motor 81 is converted into a linear movement in one axis (in the main scanning direction).

Reading Width W1 of Image Sensor 61

Figure 5:
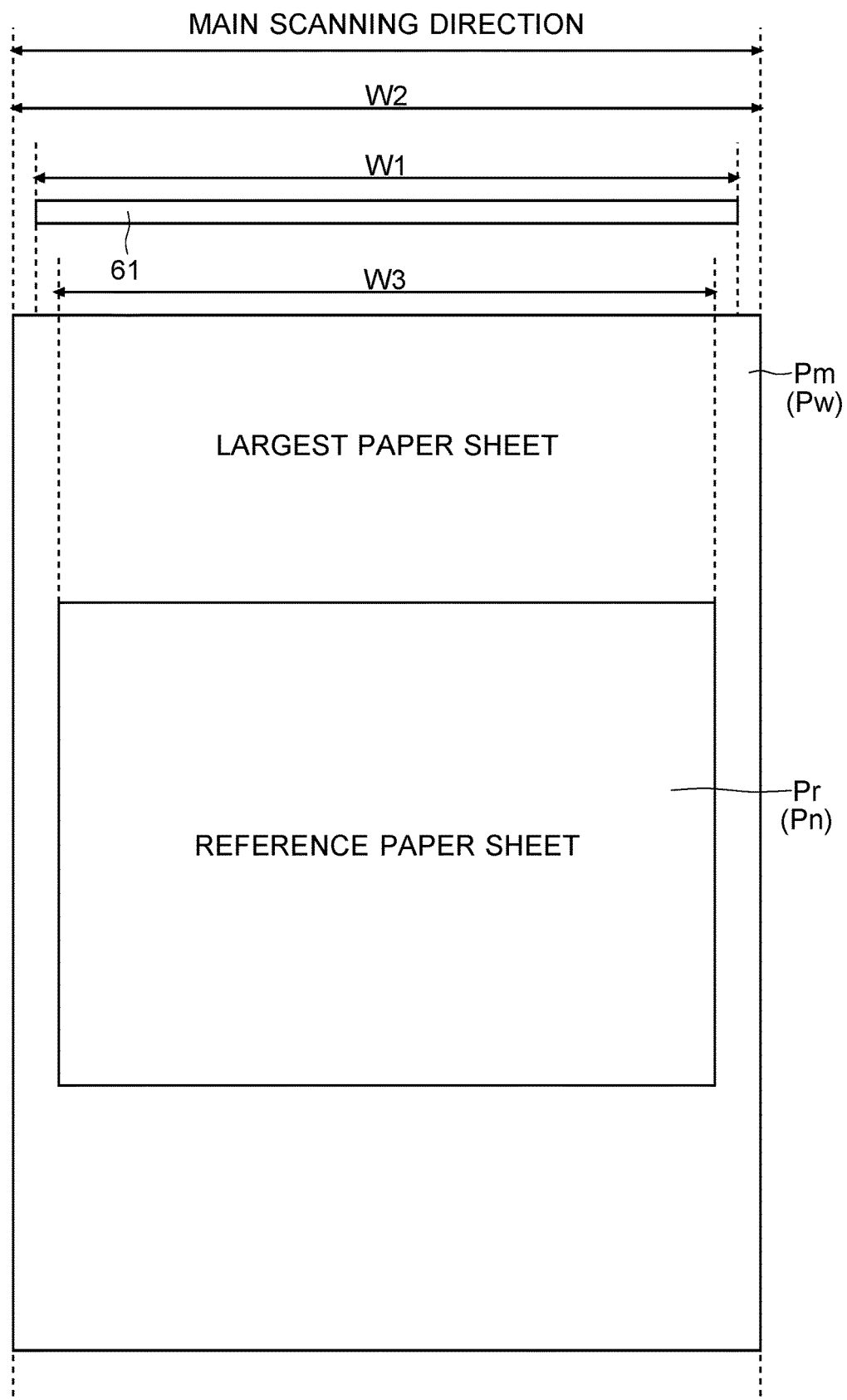
FIG. 5 is a diagram illustrating one example of a reading width of an image sensor according to the embodiment.

Next, with reference to FIG. 5, one example of a reading width W1 of the image sensor 61 according to the embodiment is described. In FIG. 5, the largest rectangle indicates the paper sheet of a largest size that can be printed by the image forming apparatus 100. In the following description, the paper sheet of a largest size that can be printed by the image forming apparatus 100 is referred to as a largest paper sheet Pm. The largest paper sheet Pm is determined in advance. As for the image forming apparatus 100, the largest paper sheet Pm is SRA3. The SRA3 size is larger than the A3 size. A long side of the SRA3 is 450 mm, and a short side thereof is 320 mm. The SRA3 size paper sheet is a paper sheet in consideration of cutting off its sides after printing so as to make the A3 size. The SRA3 size paper sheet is used for obtaining a printed matter of the A3 size with border-free printing.

The reading width W1 of the image sensor 61 in the main scanning direction is smaller than a width W2 of the short side of the largest paper sheet Pm. Further, the reading width W1 of the image sensor 61 in the main scanning direction is larger than a width W3 of the long side of a predetermined reference paper sheet Pr. A size of the reference paper sheet Pr can be determined based on the paper sheet of a frequently used size. For instance, the size of the reference paper sheet Pr is the A4 size. The size of the reference paper sheet Pr may be a letter size. FIG. 5 illustrates an example in which the A4 size sheet is the reference paper sheet Pr. When using the image sensor 61, the both edges Eg in the main scanning direction can be read for the reference paper sheet Pr and for a paper sheet smaller than the reference paper sheet Pr. In other words, the reading width W1 of the image sensor 61 in the main scanning direction is smaller than the main scanning direction widths of some paper sheets out of printable size paper sheets. The reading width W1 is smaller than the short side of the predetermined largest paper sheet Pm, and is larger than the long side of the predetermined reference paper sheet Pr.

In the following description, the paper sheet having a main scanning direction width larger than the reading width W1 of the image sensor 61 is referred to as a large width sheet Pw. The large width sheet Pw is SRA3 described in the above example. Further, the paper sheet having a main scanning direction width smaller than the reading width W1 is referred to as a small width sheet Pn in the following description.

Recognition of Deviation of Small Width Sheet Pn

Figure 6:
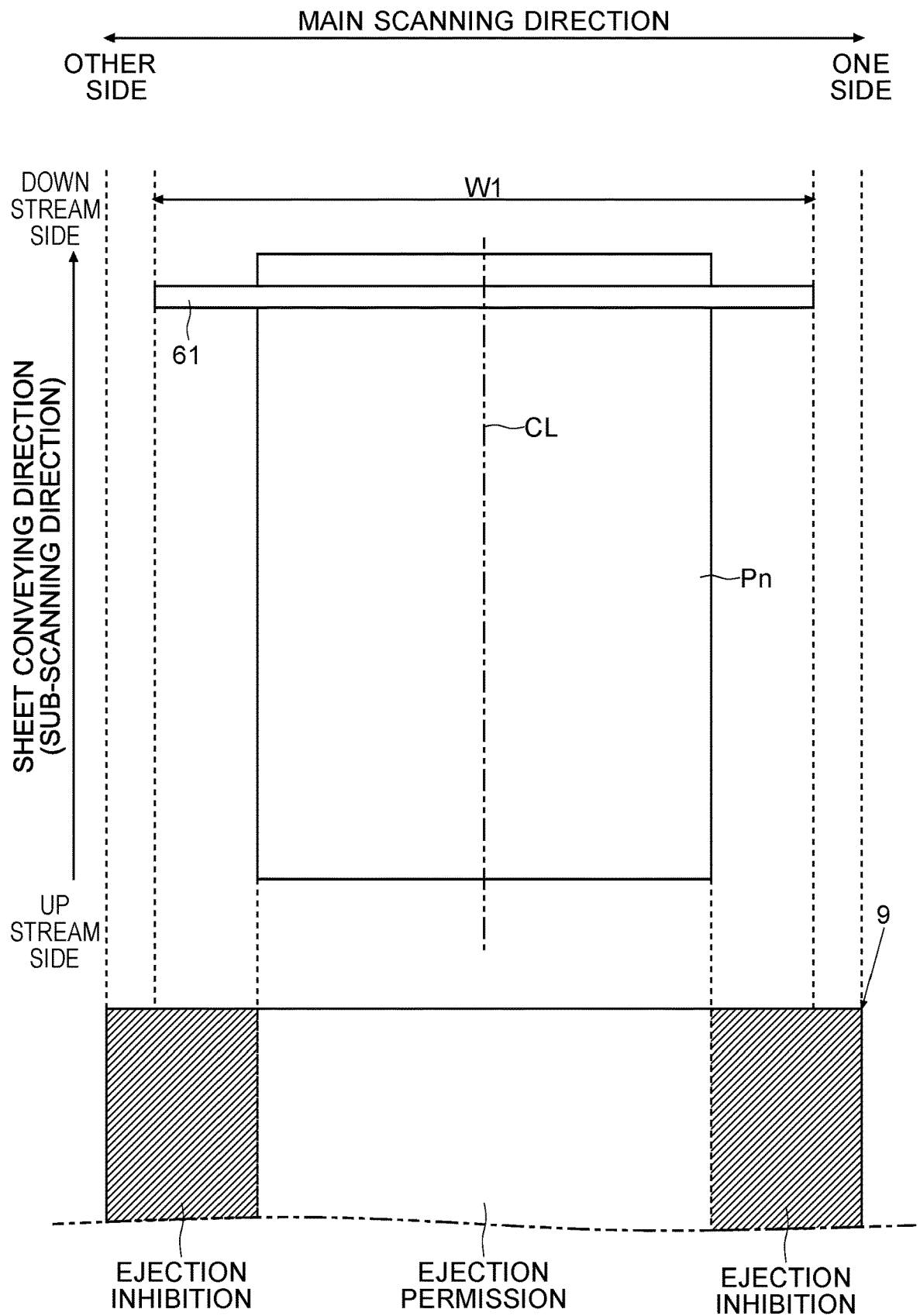
FIG. 6 is a diagram for explaining one example of recognition of deviation of a small width sheet according to the embodiment.
Figure 7:
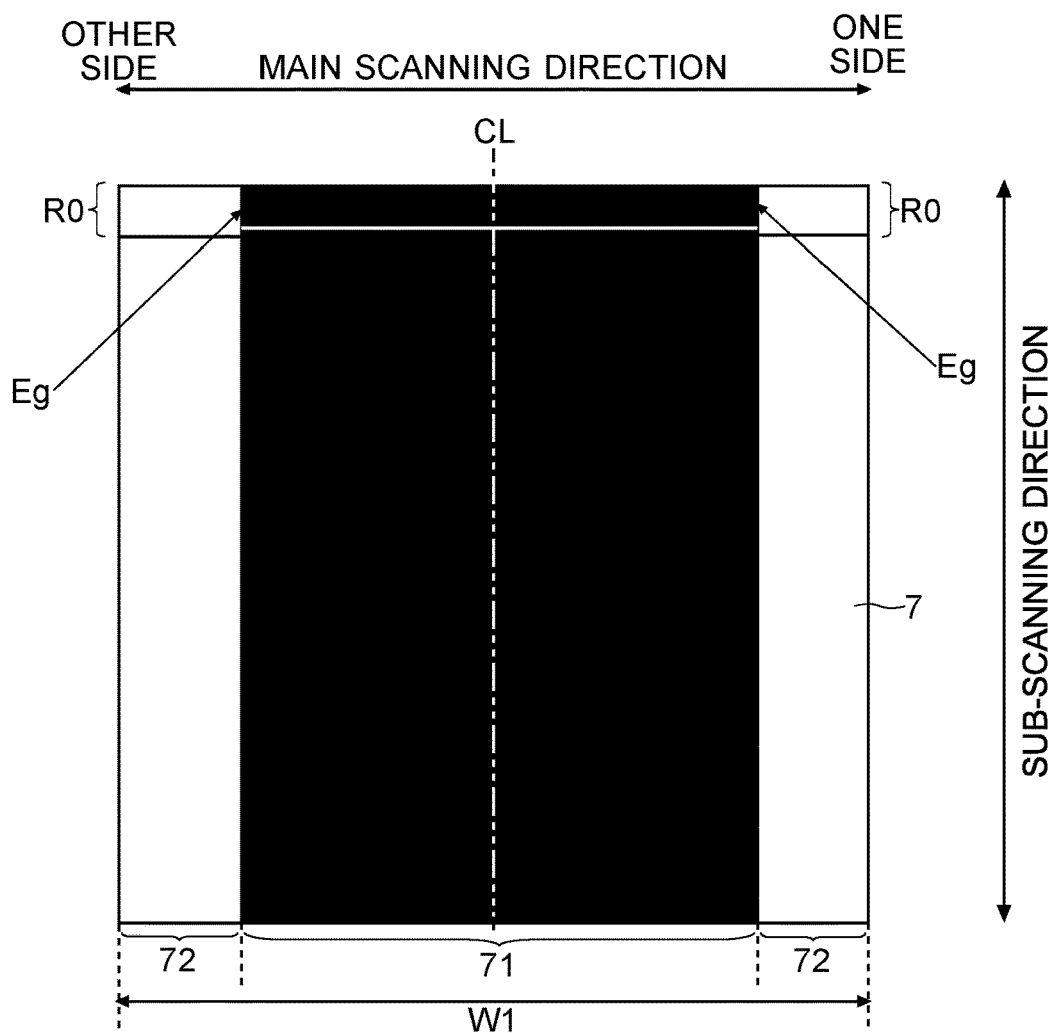
FIG. 7 is a diagram illustrating one example of read image data according to the embodiment.

Next, with reference to FIGS. 6 and 7, there is described one example of recognition of deviation of the small width sheet Pn in the image forming apparatus 100 according to the embodiment. First, the image forming apparatus 100 performs center sheet passing. In the center sheet passing, the sheet conveyor 4a conveys the paper sheet so that the center of the paper sheet in the main scanning direction coincides with the center of the sheet conveying path 412 in the main scanning direction. In FIG. 6, a double dotted and dashed line in the up and down direction indicates one example of a reference center line CL. The reference center line CL coincides with the center of the sheet conveying path 412 in the main scanning direction. In FIG. 6, the image sensor 61 is at a reference position. The reference center line CL coincides with the center of the reading width W1 of the image sensor 61. The reference position of the image sensor 61 is a position in which the center of the reading width W1 of the image sensor 61 in the main scanning direction coincides with the reference center line CL.

When performing the center sheet passing, the paper sheets are set in the sheet feeder 100a (the sheet feed cassette 101) so that the center of the sheet conveying path 412 in the main scanning direction coincides with the center of the paper sheet. The sheet feed cassette 101 includes a pair of cursors (not shown) for regulating the paper sheets. The pair of cursors are interlocked with each other and slidingly move. The pair of cursors hold the paper sheets therebetween. The pair of cursors contact sides of the paper sheet, which are parallel to the sheet conveying direction (a sub-scanning direction). The pair of cursors regulate a position of the paper sheets so that the center of the paper sheet in the main scanning direction coincides with the reference center line CL (the center of the sheet conveying path 412 in the main scanning direction).

However, a position of the conveyed paper sheet may be deviated in a sheet feeding process or a sheet conveying process. On the basis of the read image data 7, the controller 1 recognizes a deviation direction and a deviation amount of the small width sheet Pn in the main scanning direction. With reference to FIG. 7, one example of recognition of the deviation direction and the deviation amount of the small width sheet Pn is described.

For instance, when starting the print job, the controller 1 controls the lamp 60 on and controls the image sensor 61 to begin reading before beginning to feed the first paper sheet. The controller 1 controls a ring buffer in the storage medium 2 to store the read image data 7 obtained by reading by the image sensor 61. The controller 1 continues to control the lamp 60 on, the image sensor 61 to read, and the ring buffer to store the read image data 7 until the print job ends.

The reader 6 (image sensor 61) is disposed on the upstream side of the registration sensor 43 in the sheet conveying direction. When the controller 1 recognizes arrival of the front end of the paper sheet based on the output of the registration sensor 43, the paper sheet has surely reached the image sensor 61. The controller 1 recognizes an address in the storage medium 2 (ring buffer) of the read image data 7 that was written when the front end of the paper sheet reached the registration sensor 43 (an address when the front end reached). On the other hand, a distance between the registration sensor 43 and the image sensor 61 is determined. The number of go-back lines is determined in advance, which is the number of lines in the sheet conveying direction (the sub-scanning direction), corresponding to the distance between the registration sensor 43 and the image sensor 61. The controller 1 recognizes the line in the main scanning direction, which goes back by the number of go-back lines from the address when the front end reached, as a first line in the read image data 7 of one page.

FIG. 7 illustrates one example of the read image data 7 of one page of the conveyed small width sheet Pn. It is necessary to determine (detect) the deviation direction and the deviation amount before the front end of the paper sheet reaches the most upstream line head 49. Therefore, the deviation direction and the deviation amount are recognized on the basis of the read image data 7 of a few mm to a few cm from the head. In the read image data 7, an area that is used for detecting the deviation direction and the deviation amount is referred to as a detection use area R0. A size of the detection use area R0 (a length in the sub-scanning direction and the number of lines of data in the main scanning direction to be used) is determined in advance.

The controller 1 recognizes sheet reading pixels 71 for each line data in the main scanning direction (main scanning line data) of the detection use area R0. The controller 1 recognizes pixels having pixel values higher than a predetermined threshold value (darker pixels or higher density pixels) as the sheet reading pixels 71. In the part where the paper sheet exists, the light from the lamp 60 is blocked by the paper sheet. Pixels in the part obtained by reading the paper sheet are high density pixels. On the other hand, the controller 1 recognizes pixels in a part where the paper sheet is not read (pixels having pixel values lower than a threshold value or pixels other than the high density pixels) as non-sheet pixels 72. The part where the paper sheet does not exist, the light from the lamp 60 is not blocked. Therefore, the pixel values are small (low density) values.

Further, the controller 1 recognizes positions of the sheet reading pixels 71 (the high density pixels) on both ends in the main scanning direction, in each main scanning line data. The sheet reading pixels 71 on both ends in the main scanning direction indicate side edges (the edges Eg) of the small width sheet Pn. In the sheet reading pixels of each main scanning line data, the controller 1 recognizes one side edge pixel, which is the sheet reading pixel 71 indicating one side edge of the paper sheet in the main scanning direction. Further, in the sheet reading pixels 71, the controller 1 recognizes the other side edge pixel, which is the sheet reading pixel 71 indicating the other side edge of the paper sheet in the main scanning direction.

The controller 1 recognizes the center position between the one side edge pixel and the other side edge pixel for each main scanning line data of the detection use area R0. Then, the controller 1 calculates an average of the center positions. Further, an ideal center position is set in advance. The ideal center position is the center position between both ends of the small width sheet Pn without a deviation in the main scanning direction. The ideal center position coincides with a position of the reference center line CL.

The controller 1 recognizes a difference between the calculated average center position and the ideal center position. The controller 1 recognizes an absolute value of the difference as the deviation amount (the number of dots of the deviation). The controller 1 can recognize the deviation direction based on whether or not the average center position is on one side or on the other side of the ideal center position. The controller 1 moves the ink ejection position of the line head 49 by the recognized deviation amount in the recognized deviation direction. Specifically, the controller 1 shifts the image data to be supplied to the line head 49 in the main scanning direction so as to adjust the printing position.

Mask Data 9

Figure 8:
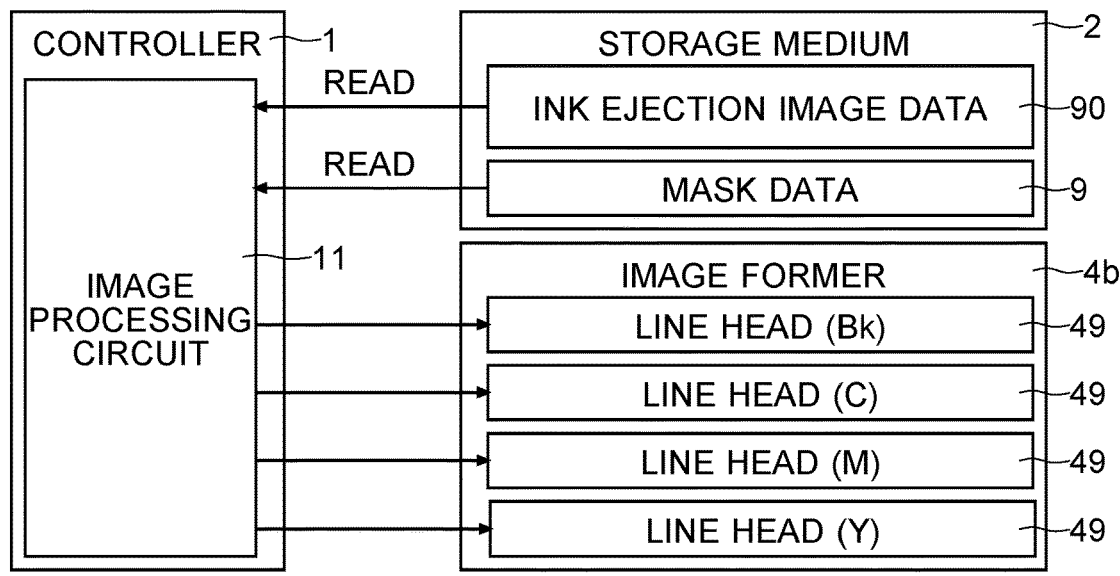
FIG. 8 is a diagram illustrating one example of printing using mask data according to the embodiment.

Next, with reference to FIGS. 6 and 8, one example of mask data 9 according to the embodiment is described. On the basis of the read image data 7, the controller 1 generates the mask data 9. The mask data 9 is data defining whether or not to eject ink from the nozzle. The number of pixels of the mask data 9 in the main scanning direction is the same as the number of pixels of each line head 49 in the main scanning direction. The number of pixels in the sub-scanning direction of the mask data 9 is a value obtained by dividing the size of the paper sheet in the sub-scanning direction by a pitch of one pixel in the sub-scanning direction. In this way, a size of the mask data 9 is determined in advance. One pixel of data in the main scanning direction of the mask data 9 corresponds to one nozzle. The controller 1 generates the mask data 9 for each color.

Before ink ejection, the controller 1 needs to finish data generation of the line for which ink is to be ejected in the mask data 9. When one line data in the main scanning direction of the read image data 7 is generated, the controller 1 immediately generates the mask data 9 for the corresponding line in the main scanning direction.

In the mask data 9, the controller 1 sets an ink ejection permitting value for pixels corresponding to the sheet reading pixels 71. For instance, the mask data 9 is binary data. For instance, value "0" indicates ejection inhibition while value "1" indicates ejection permission, and then the controller 1 sets "1" to pixel values of pixels corresponding to the sheet reading pixels 71 in the mask data 9. The controller 1 sets "0" to pixel values of pixels corresponding to the non-sheet pixels 72 in the mask data 9 and pixels corresponding to the area that cannot be read by the image sensor 61. In FIG. 6, ink ejection inhibition areas in the mask data 9 are indicated with hatching.

For instance, in the read image data 7, a part where the paper sheet is folded is the non-sheet pixel 72. The controller 1 generates the mask data 9 that inhibits ink ejection at positions corresponding to the folded part. The mask data 9 can inhibit ink ejection to the folded part. Further, perforated (punched) paper sheet may be used. The image sensor 61 reads holes, too. The hole parts correspond to non-sheet pixels 72. The controller 1 generates the mask data 9 that inhibits ink ejection at positions corresponding to the hole parts. In this way, it is possible to prevent ink ejection to the hole parts.

The lower part of FIG. 6 indicates one example of the generated mask data 9. As illustrated in FIG. 7, the controller 1 determines the sheet reading pixels 71 and the non-sheet pixels 72 in the read image data 7. On the basis of read image data 7, the controller 1 determines pixel values of pixels in the mask data 9. In the case of the small width sheet Pn, the controller 1 sets the ink ejection permitting value to pixel values of the pixels from the pixel corresponding to the one side edge pixel to the pixel corresponding to the other side edge pixel in the mask data 9. The controller 1 sets an ink ejection inhibiting value to the pixel values of the pixels outside the pixel corresponding to the one side edge pixel and the pixels outside the pixel corresponding to the other side edge pixel in the main scanning direction.

On the basis of the mask data 9, the controller 1 controls the ink ejection. The controller 1 (the image processing circuit 11) analyzes the print data sent and received from the computer 200, and generates the image data. For instance, the controller 1 performs a rasterization process so as to generate the image data. After performing image processing in accordance with setting, the image processing circuit 11 generates the ink ejection image data 90.

For instance, the ink ejection image data 90 and the mask data 9 have the same size and the same resolution. The ink ejection image data 90 is image data obtained by performing a halftone dot process (halftone process). The ink ejection image data 90 is data in which an image is drawn as a dot pattern. The ink ejection image data 90 is data indicating ON or OFF of ink ejection of each pixel.

For instance, the controller 1 reads the mask data 9 and the ink ejection image data 90 by line in the main scanning direction. The controller 1 performs logical AND between line data of the mask data 9 and line data of the ink ejection image data 90 at the same position in the sub-scanning direction. The controller 1 performs logical AND between pixel values of the pixels at the same position. Using the mask data 9, the pixel value of the ink ejection image data 90 may be corrected to the value indicating ink ejection inhibition. As illustrated in FIG. 8, the controller 1 sends to the line head 49 the ink ejection image data 90 corrected using the mask data 9. The controller 1 sends the same by line or by unit of a plurality of lines. The line head 49 ejects ink based on the received ink ejection image data 90.

Recognition of Deviation of Large Width Sheet Pw

Figure 9:
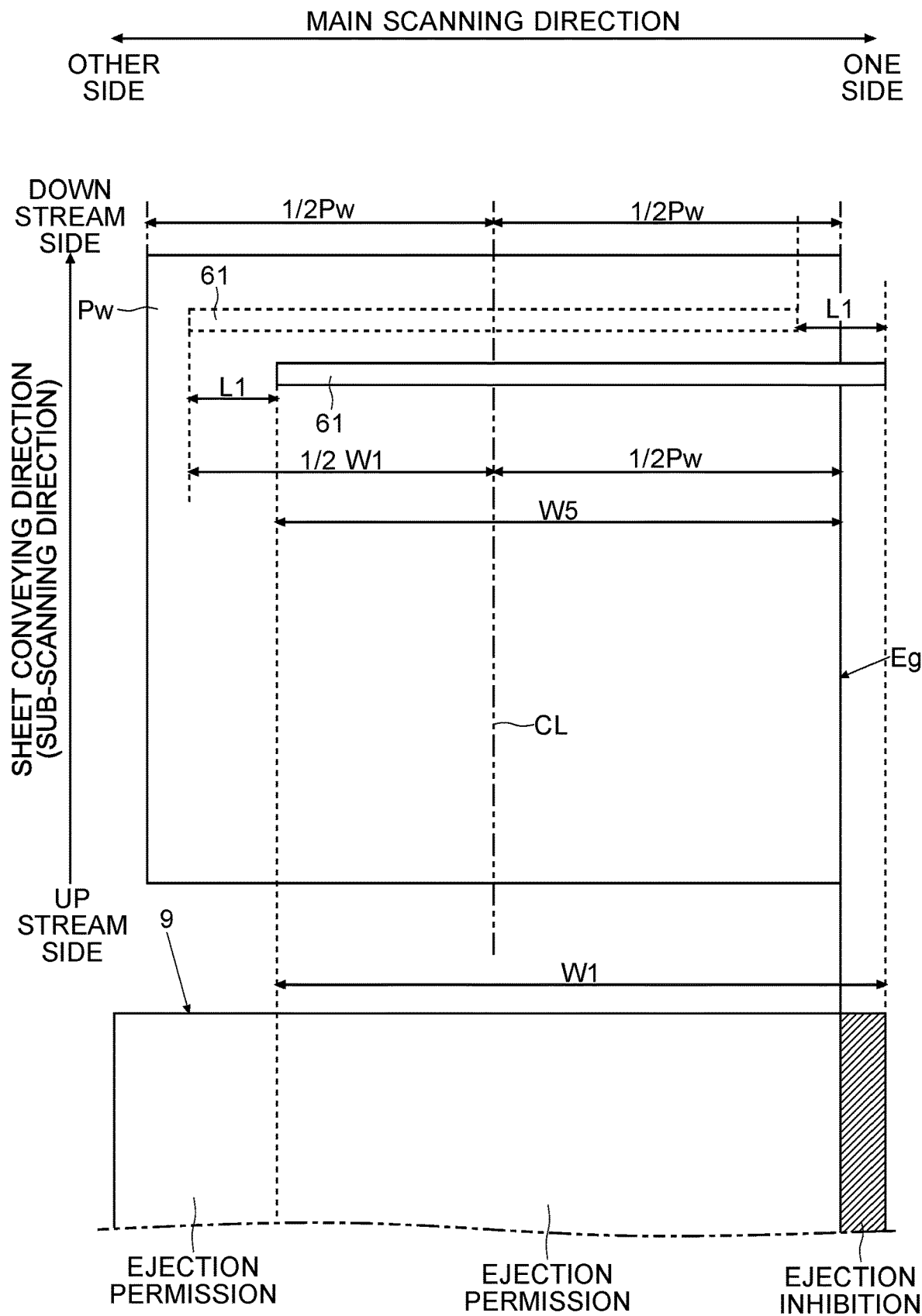
FIG. 9 is a diagram for explaining one example of recognition of deviation of a large width sheet according to the embodiment.
Figure 10:
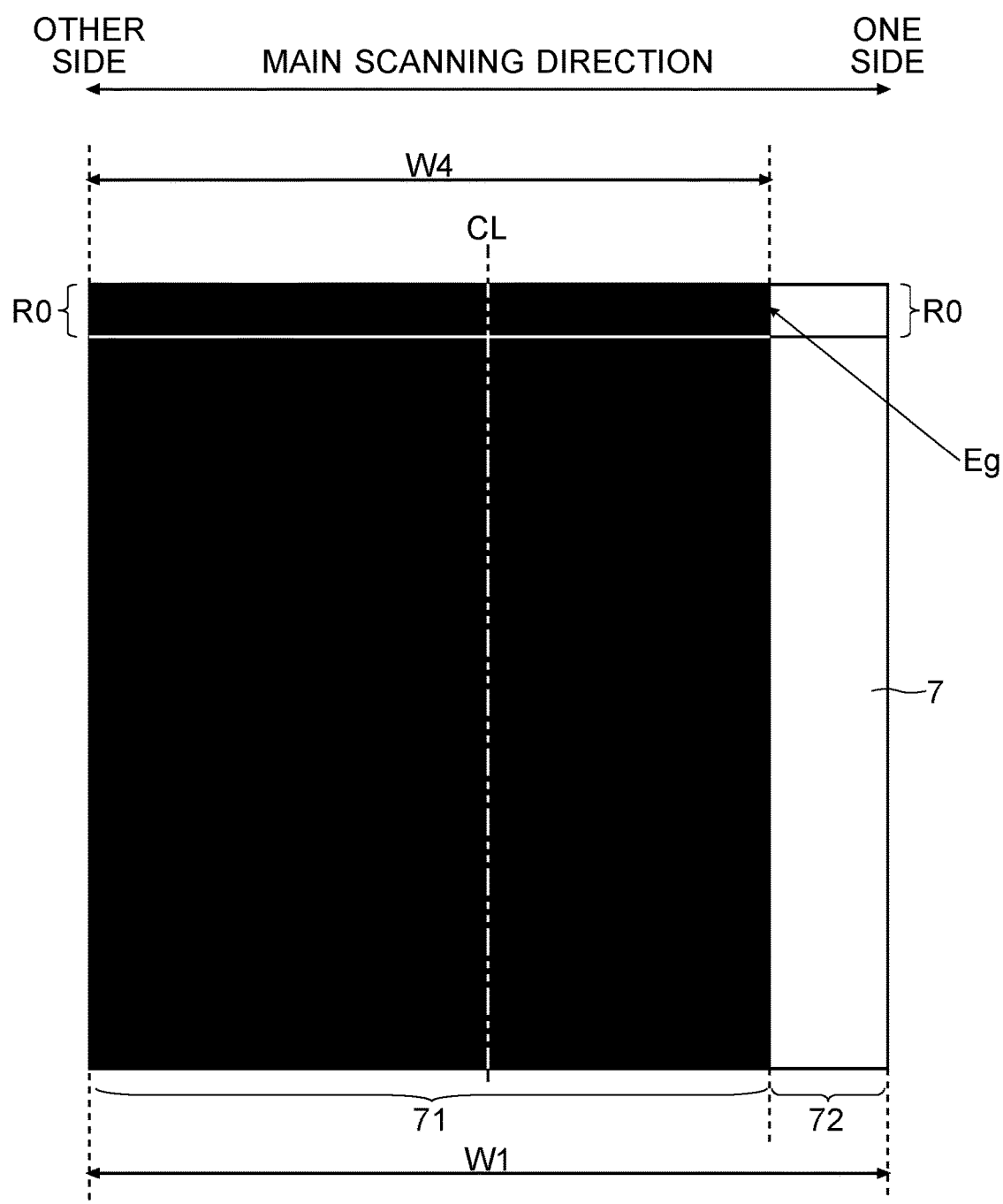
FIG. 10 is a diagram illustrating one example of read image data according to the embodiment.

Next, with reference to FIGS. 9 and 10, there is described one example of recognition of deviation of the large width sheet Pw in the image forming apparatus 100 according to the embodiment. As described above, the image forming apparatus 100 performs the center sheet passing. In FIG. 9, a double dotted and dashed line in the up and down direction indicates the reference center line CL. The reference center line CL coincides with the center of the sheet conveying path 412 in the main scanning direction. In FIG. 9, a broken line rectangle indicates one example of the image sensor 61 at the reference position. The reference position of the image sensor 61 is a position in which the center of the reading width W1 in the main scanning direction coincides with the reference center line CL (the center of the sheet conveying path 412 in the main scanning direction).

Here, in a case where the conveyed paper sheet is the large width sheet Pw, the image sensor 61 at the reference position cannot read the edge Eg of the large width sheet Pw. Therefore, when the large width sheet Pw is conveyed (when printing is performed on the large width sheet Pw), the controller 1 controls the moving mechanism 8 to move the image sensor 61 (the reader 6) in the main scanning direction. In FIG. 9, one example of a position of the image sensor 61 after being moved is shown as a solid line rectangle. For convenience of easy reference, positions of the image sensor 61 in the sub-scanning direction before and after being moved are shifted from each other in FIG. 9. In reality, the position of the image sensor 61 in the sub-scanning direction is not changed before and after being moved.

The controller 1 controls the moving mechanism 8 to move the image sensor 61 (reader 6) from the reference position to the one side. The controller 1 controls so that one side edge Eg of the large width sheet Pw in the main scanning direction can be read. The one side means the direction to which the image sensor 61 is moved when the large width sheet Pw is used. The other side means the opposite side (opposite direction) to the one side in the main scanning direction. Note that after the print job is finished, the controller 1 controls the moving mechanism 8 to move the image sensor 61 toward the other side. The controller 1 returns the image sensor 61 to the reference position.

A movement distance L1 (movement amount) of the image sensor 61 in the main scanning direction is determined in advance. The movement distance L1 is constant regardless of a size of the large width sheet Pw. For instance, the controller 1 controls the moving mechanism 8 to move the image sensor 61 (having the reading width W1) until one side end thereof reaches one side end of the sheet conveying path 412. The movement distance L1 is set to any value between 1 cm and 5 cm, for example.

A position of the large width sheet Pw in the main scanning direction may be deviated in the sheet feeding process or the sheet conveying process. On the basis of the read image data 7, the controller 1 recognizes the deviation direction and the deviation amount of the large width sheet Pw in the main scanning direction. With reference to FIG. 10, one example of recognition of the deviation direction and the deviation amount is described. The time point when turning on the lamp 60 and starting reading by the image sensor 61 is the same as that in the case of the small width sheet Pn. Further, the time point when turning off the lamp 60 and finishing reading is also the same as that in the case of the small width sheet Pn.

FIG. 10 illustrates one example of the read image data 7 obtained by reading the large width sheet Pw. It is necessary to determine (detect) the deviation direction and the deviation amount before the front end of the paper sheet reaches the most upstream line head 49. Also for the large width sheet Pw, the controller 1 determines the deviation direction and the deviation amount on the basis of the detection use area R0 in the read image data 7.

The controller 1 recognizes whether each pixel of the line data in the main scanning direction of the detection use area R0 (the main scanning line data) is the sheet reading pixel 71 or the non-sheet pixel 72. Further, the controller 1 recognizes a position of the one sidemost sheet reading pixel 71 (the high density pixel) in each main scanning line data. The one sidemost sheet reading pixel 71 indicates a side edge (edge Eg) on the one side of the large width sheet Pw. For each main scanning line data, the controller 1 recognizes the one side edge pixel that is the sheet reading pixel 71, indicating the one side end of the paper sheet in the main scanning direction.

For each main scanning line data in the detection use area R0, the controller 1 multiplies the number of pixels from the other side end to the one side edge pixel in the main scanning direction of the read image data 7 by the pitch of one pixel, so as to calculate a length. The controller 1 calculates an average value of the length calculated for each main scanning line data in the detection use area R0, as a read paper sheet width W4. The controller 1 calculates the read paper sheet width W4 as a distance between the other side end in the main scanning direction in the read image data 7 and the one side edge Eg of the large width sheet Pw. FIG. 10 shows one example of the read paper sheet width W4 by a solid line arrow.

The controller 1 compares the calculated read paper sheet width W4 with an expected value W5. The expected value W5 is determined in advance. The storage medium 2 stores the expected value W5 in a nonvolatile manner (see FIG. 2). The controller 1 refers to the expected value W5 stored in the storage medium 2. When there are a plurality of types of the large width sheet Pw, the expected value W5 is determined for each of the sizes of the large width sheet Pw. The expected value W5 is calculated based on the following equation.

expected value $W5 = \frac{1}{2}$(reading width $W1$) + $\frac{1}{2}$(large width sheet $Pw$) − (movement distance $L1$)

The expected value W5 coincides with the read paper sheet width W4 of the large width sheet Pw without a deviation in the main scanning direction. In FIG. 9, one example of the expected value W5 is shown by a solid line arrow. In FIG. 9, a half width of the large width sheet Pw is denoted by ½Pw. Further, in FIG. 9, a half width of the reading width W1 is denoted by ½W1.

An absolute value of a difference between the read paper sheet width W4 and the expected value W5 indicates the deviation amount of the large width sheet Pw in the main scanning direction. The controller 1 calculates an absolute value of a difference between the expected value W5 and the calculated read paper sheet width W4, as the deviation amount. The deviation direction can be recognized based on a large or small relationship between the read paper sheet width W4 and the expected value W5. The controller 1 recognizes the deviation direction based on the large or small relationship between the expected value W5 and the calculated read paper sheet width W4. The controller 1 subtracts the expected value W5 from the read paper sheet width W4. When the difference calculated by the subtraction is positive, the controller 1 recognizes that the large width sheet Pw (the conveyed paper sheet) is shifted to the one side in the main scanning direction. When the calculated difference is negative, the controller 1 recognizes that the large width sheet Pw (the conveyed paper sheet) is shifted to the other side in the main scanning direction. The controller 1 shifts the ink ejection position of the line head 49 by the recognized deviation amount in the recognized deviation direction. Specifically, the controller 1 shifts the image data to be supplied to the line head 49 in the main scanning direction so as to adjust the printing position.

Mask Data 9

Next, with reference to FIG. 9, one example of the mask data 9 is described, which is generated when printing on the large width sheet Pw by the image forming apparatus according to the embodiment.

Also when printing on the large width sheet Pw, the controller 1 generates the mask data 9 based on the read image data 7. Also in the mask data 9 of the large width sheet Pw, the number of pixels in the main scanning direction is the same as the number of pixels of each line head 49 in the main scanning direction. The number of pixels in the sub-scanning direction of the mask data 9 is a value obtained by dividing the size of the paper sheet in the sub-scanning direction by a pitch of one pixel in the sub-scanning direction. Also in the large width sheet Pw, the controller 1 generates the mask data 9 for each color.

Before ink ejection, the controller 1 needs to finish generation of the mask data 9 of the line for which ink is to be ejected. When one line data is generated in the main scanning direction of the read image data 7, the controller 1 immediately adjusts pixel values of the line corresponding to the read image data 7 generated newly in the mask data 9.

On the basis of the read image data 7, the controller 1 recognizes the sheet reading pixels 71 and the non-sheet pixels 72. Further, the controller 1 recognizes the one side edge pixel for each line in the main scanning direction. The controller 1 sets the ink ejection permitting value to pixel values of pixels corresponding to the sheet reading pixels 71 in the mask data 9.

Here, the reading width W1 of the image sensor 61 is smaller than the main scanning direction width of the large width sheet Pw. In order to read the one side edge Eg in the main scanning direction, the controller 1 controls to move the image sensor 61 in the main scanning direction. Therefore, the controller 1 sets the ink ejection inhibiting value to pixel values of pixels on the one side of the pixel corresponding to the one side edge pixel in the mask data 9.

When the image sensor 61 is moved, the other side edge Eg of the large width sheet Pw in the main scanning direction cannot be detected. Therefore, in setting for using the large width sheet Pw, the controller 1 sets the ink ejection permitting value for pixels in the mask data 9 on the other side of the pixel corresponding to the other sidemost pixel in the read image data 7. In other words, in the mask data 9, the controller 1 sets the ink ejection permitting value to pixel values of pixels on the other side of the one side edge pixel. In this way, all of the content is printed on the large width sheet Pw. Note that the controller 1 may set the ink ejection inhibiting value for pixels on the other side of the other sidemost pixel in the read image data 7 (details are described later).

The lower part of FIG. 9 shows one example of the mask data 9 generated based on the read image data 7. As illustrated in FIG. 9, on the basis of the read image data 7, the controller 1 determines pixel values of pixels in the mask data 9. It is obvious that the paper sheet does not exist on the one side of the one side edge pixel. Therefore, in the mask data 9, the ink ejection inhibiting value is set to pixel values of pixels on the one side of the pixel corresponding to the one side edge pixel. The controller 1 sets the ink ejection permitting value to pixel values of pixels corresponding to the sheet reading pixels 71 in the mask data 9.

The controller 1 controls ink ejection based on the mask data 9. First, the controller 1 (the image processing circuit 11) analyzes the print data sent and received from the computer 200, so as to generate the image data. For instance, the controller 1 performs the rasterization process so as to generate the image data. The image processing circuit 11 performs image processing in accordance with setting, and then generates the ink ejection image data 90.

For instance, the controller 1 reads the mask data 9 and the ink ejection image data 90 by line in the main scanning direction. The controller 1 performs logical AND between line data of the mask data 9 and line data of the ink ejection image data 90 at the same position in the sub-scanning direction. The controller 1 performs logical AND between pixel values of the pixels at the same position. Using the mask data 9, the pixel value of the ink ejection image data 90 may be corrected to the value indicating ink ejection inhibition.

The controller 1 sends to the line head 49 the ink ejection image data 90 corrected using the mask data 9. The controller 1 sends the same by line or by unit of a plurality of lines in the main scanning direction. The line head 49 ejects ink on the basis of the received ink ejection image data 90.

Process Flow when Printing on Large Width Sheet Pw

Figure 11:
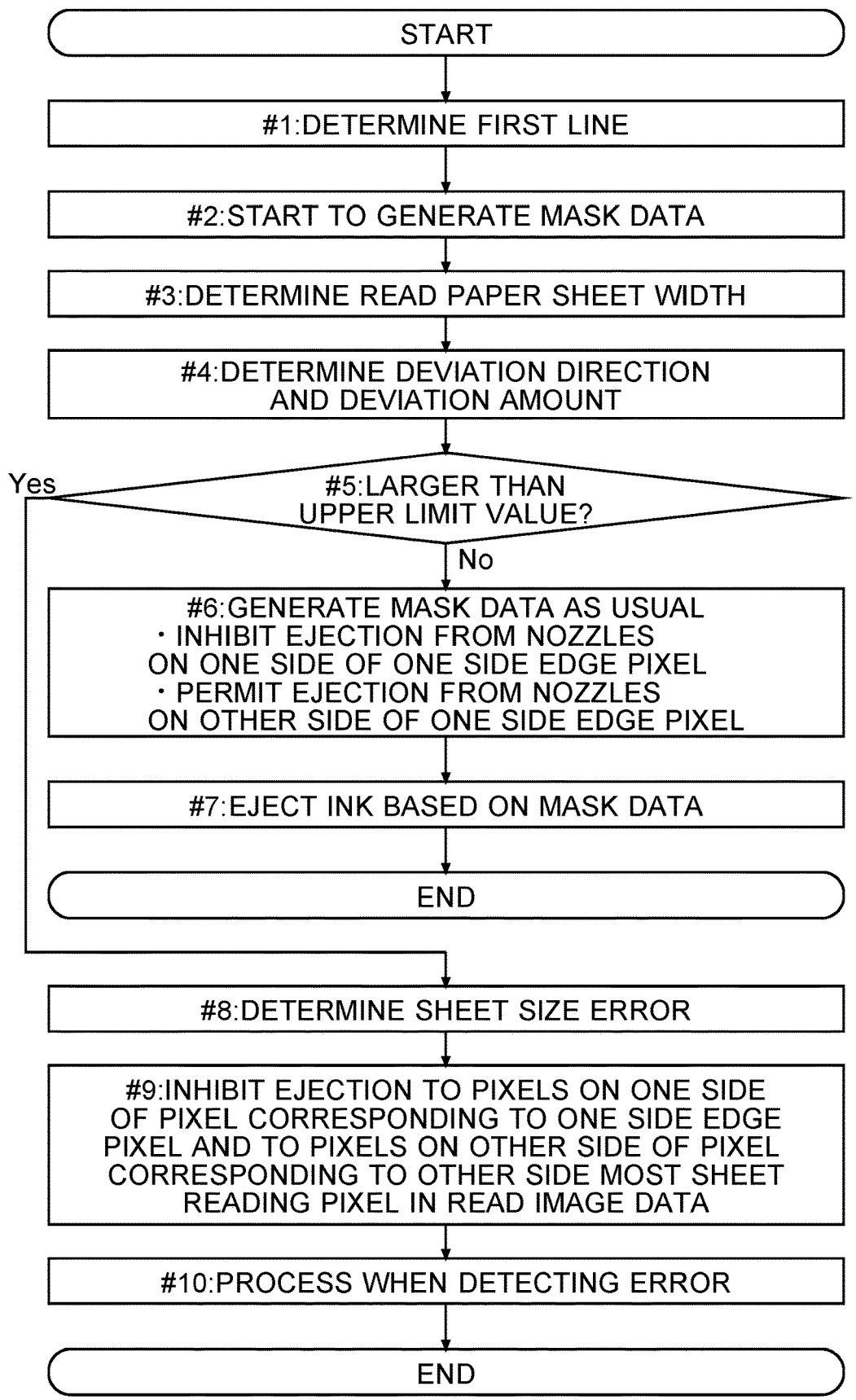
FIG. 11 is a diagram illustrating one example of a process flow when printing by the image forming apparatus according to the embodiment.

Next, with reference to FIG. 11, one example of a process flow when printing by the image forming apparatus 100 according to the embodiment is described. FIG. 11 illustrates one example of a process flow when printing on the large width sheet Pw. The flow of FIG. 11 starts when it is recognized that the front end of the large width sheet Pw has reached the registration sensor 43. The controller 1 performs the flow of the FIG. 11 every time when recognizing that the front end of the large width sheet Pw has reached the registration sensor 43.

Note that the controller 1 controls the reader 6 (the lamp 60 and the image sensor 61) to operate before the flow of FIG. 11 starts. After that, the image sensor 61 periodically outputs the analog image signal i1 until the print job is finished. The controller 1 (the image data generation circuit 12) periodically processes the analog image signal i1 and generates the read image data 7 one by one line. Further, the sheet feed cassette 101 sends out the large width sheet Pw. The controller 1 controls the sheet conveyor 4a to operate and convey the paper sheet toward the discharge tray 105.

Further, before the flow of FIG. 11 starts, and before the image sensor 61 starts reading, the controller 1 controls the moving mechanism 8 to move the image sensor 61 to the one side in the main scanning direction. The movement of the image sensor 61 has completed. For instance, when the operation panel 3 accepts the large width sheet Pw as the paper sheet to be used, the controller 1 controls the moving mechanism 8 to move the image sensor 61.

When recognizing that the front end of the large width sheet Pw has reached the registration sensor 43, the controller 1 determines the first line of the read image data 7 of one page (Step #1). Along with determination of the first line of the page, the controller 1 starts to generate the mask data 9 (Step #2).

After determining the first line of the read image data 7 of the large width sheet Pw of the one page, when reading of the detection use area R0 is finished, the controller 1 determines the read paper sheet width W4 (Step #3). On the basis of the determined read paper sheet width W4, the controller 1 determines the deviation direction and the deviation amount (Step #4). Then, the controller 1 checks whether or not the determined deviation amount is larger than an upper limit value A1 (Step #5).

The upper limit value A1 is determined in advance. The storage medium 2 stores the upper limit value A1 in a nonvolatile manner (see FIG. 2). The multifunction peripheral can use a plurality of sizes of the paper sheets. For instance, ½ of a difference between adjacent main scanning direction widths of paper sheets (minimum difference) among different sizes of paper sheets can be determined as the upper limit value A1. Further, in the image forming apparatus 100, a permissible range of the position deviation in the main scanning direction may be determined in the specification. A maximum value in this permissible range may be set as the upper limit value A1.

When the deviation amount is the upper limit value A1 or smaller (No in Step #5), the controller 1 generates the mask data 9 as usual (Step #6). Specifically, the controller 1 generates the mask data 9 for inhibiting ink ejection from nozzles on the one side of the one side edge pixel. Further, the controller 1 generates the mask data 9 that permits ink ejection from nozzles on the other side of the one side edge pixel. The controller 1 controls the line head 49 to eject ink on the basis of the generated mask data 9 (Step #7). Then, the controller 1 finishes the process of this flowchart (END).

When the deviation amount is larger than the upper limit value A1 (Yes in Step #5), the controller 1 determines that a sheet size error has occurred (Step #8). In this case, the controller 1 may control the operation panel 3 (the display panel 31) to display a massage indicating that a sheet size error has occurred. Further, the controller 1 sets the ink ejection inhibiting value for pixels on the one side of the pixel corresponding to the one side edge pixel in the mask data 9, and pixels on the other side of the pixel corresponding to the other sidemost sheet reading pixel 71 in the mask data 9 (Step #9). In this way, ink ejection to the areas where the paper sheet does not exist is prevented.

Further, the controller 1 performs a process when detecting an error (Step #10). Then, the controller 1 finishes the flow of this flowchart (END). In the process when detecting an error, the controller 1 prevents the sheet feeder 100a from feeding the next paper sheet, for example. Further, the controller 1 stops the sheet conveyor 4a after discharging all paper sheets remaining in the sheet conveying path 412.

In this way, the image forming apparatus 100 according to the embodiment includes the sheet feeder 100a, the sheet conveyor 4a, the line head 49, the image sensor 61, the moving mechanism 8, and the controller 1. The sheet feeder 100a feeds the paper sheet. The sheet conveyor 4a conveys the paper sheet fed from the sheet feeder 100a. The line head 49 includes a plurality of nozzles aligned in the main scanning direction perpendicular to the sheet conveying direction. The line head 49 ejects ink from the nozzles to the conveyed paper sheet so as to perform printing. The image sensor 61 is disposed on the upstream side of the line head 49 in the sheet conveying direction. The image sensor 61 reads the conveyed paper sheet in the main scanning direction. The image sensor 61 has the reading width W1 in the main scanning direction, which is smaller than the main scanning direction widths of some paper sheets out of printable size paper sheets. The moving mechanism 8 moves the image sensor 61 in the main scanning direction. In setting for using the large width sheet Pw having a main scanning direction width larger than the reading width W1, the controller 1 controls the moving mechanism 8 to move the image sensor 61 from the predetermined reference position to the one side in the main scanning direction, so that the one side edge Eg out of edges Eg of the large width sheet Pw can be read. On the basis of the read image data 7 obtained by reading by the image sensor 61, the controller 1 recognizes the deviation direction and the deviation amount of the position of the conveyed large width sheet Pw in the main scanning direction.

When the large width sheet Pw (the paper sheet having the main scanning direction width larger than the reading width W1 of the image sensor 61) is conveyed, the image sensor 61 can be moved in the main scanning direction. Even when the reading width W1 of the image sensor 61 is small, the side edge of the large width sheet Pw can be read. The edge Eg of the paper sheet of any size can be read. On the basis of the read edge Eg, a position deviation of the large width sheet Pw in the main scanning direction can be also precisely recognized. As the inexpensive image sensor 61 having a small reading width W1 is used, manufacturing cost of the image forming apparatus 100 can be reduced.

In setting for using the large width sheet Pw, the controller 1 determines the read paper sheet width W4 as a distance between the other side end pixel opposite to the one side in the main scanning direction and the one side edge Eg of the large width sheet Pw in the read image data 7. On the basis of a large or small relationship between the expected value W5 that is the read paper sheet width W4 of the large width sheet Pw without a position deviation in the main scanning direction and the determined read paper sheet width W4, the controller 1 recognizes the deviation direction. On the basis of a difference between the expected value W5 and the determined read paper sheet width W4, the controller 1 recognizes the deviation amount. The deviation direction and the deviation amount of the conveyed large width sheet Pw in the main scanning direction can be precisely recognized.

The reference position is the position where the center of the reading width W1 in the main scanning direction coincides with the center of the conveyed paper sheet in the main scanning direction without a position deviation in the main scanning direction. The controller 1 calculates the expected value W5, by adding ½ of the main scanning direction width of the large width sheet Pw to be used and ½ of the reading width W1, and by subtracting therefrom the movement distance L1 of the image sensor 61 in the main scanning direction. In the case of the conveyance with the coincided centers (the center sheet passing), the expected value W5 can be set so that a deviation of the large width sheet Pw in the main scanning direction can be recognized.

The controller 1 recognizes the sheet reading pixels 71, which are pixels in the area where the paper sheet is read, and the non-sheet pixels 72, which are pixels in the area where the paper sheet is not read, in the detection use area R0 having a predetermined length in the sheet conveying direction (the sub-scanning direction) from the head of the read image data 7. The controller 1 recognizes the one side edge pixel that is the sheet reading pixel 71 indicating the one side end of the paper sheet in the main scanning direction, for each line data in the main scanning direction of the detection use area R0. For each line data in the main scanning direction of the detection use area R0, the controller 1 multiplies the number of pixels from the other side end to the one side edge pixel in the main scanning direction in the read image data 7 by the pitch of one pixel, so as to calculate a length. The controller 1 determines the average value of the calculated lengths as the read paper sheet width W4. The deviation amount and the deviation direction can be recognized quickly. Before the front end of the paper sheet reaches the most upstream line head 49, the deviation amount and the deviation direction can be recognized.

The controller 1 shifts the ink ejection position of the line head 49 by the recognized deviation amount in the recognized deviation direction. In accordance with the deviation of the large width sheet Pw in the main scanning direction, a drawing position (the ink ejection position) can be adjusted. A print position deviation can be eliminated. Precise and accurate printing can be performed. A printed matter without a printing position deviation can be obtained.

The controller 1 generates the mask data 9 defining permission or inhibition of ink ejection from the line head 49. The controller 1 recognizes the sheet reading pixels 71 in the area where the paper sheet is read, and the non-sheet pixels 72 in the area where the paper sheet is not read, in the read image data 7. The controller 1 recognizes the one side edge pixel indicating the one side end of the paper sheet in the main scanning direction, among the sheet reading pixels 71. When the large width sheet Pw is used, the controller 1 sets the ink ejection inhibiting value for pixels on the one side of the pixel corresponding to the one side edge pixel in the mask data 9. It is possible to inhibit ink ejection from the nozzle to the area where the paper sheet does not exist. It is possible to prevent ink ejection toward the outside of the paper sheet, and ink stains in the apparatus can be avoided.

Further, in setting for using the large width sheet Pw, the controller 1 sets the ink ejection permitting value for pixels in the mask data 9 on the other side of the pixel corresponding to the other sidemost pixel in the read image data 7. When the image sensor 61 is moved from the reference position, the one side edge Eg of the large width sheet Pw in the main scanning direction can be read. However, the paper sheet on the other side of the light receiving element of the other side end of the image sensor 61 cannot be read. Therefore, the other side edge Eg cannot be read. The non-sheet pixels 72 on the other side include the area where ink should be ejected (the area where the paper sheet exists). Therefore, ink ejection is permitted for the non-sheet pixels 72 on the other side. In this way, all of the content can be printed on the large width sheet Pw.

When the recognized deviation amount is larger than the predetermined upper limit value A1, the controller 1 determines that a sheet size error has occurred. When there is a setting error of the paper sheet (when the paper sheet of a different size is set), a difference between the expected value W5 and the read paper sheet width W4 becomes large. The controller 1 checks whether or not the recognized deviation amount is larger than the predetermined upper limit value A1. In this way, it is possible to determine whether or not a sheet size error has occurred.

The controller 1 generates the mask data 9 defining permission or inhibition of ink ejection from the line head 49. The controller 1 recognizes the sheet reading pixels 71 in the area where the paper sheet is read, and the non-sheet pixels 72 in the area where the paper sheet is not read, in the read image data 7. The controller 1 recognizes the one side edge pixel indicating the one side end of the paper sheet in the main scanning direction, among the sheet reading pixels 71. When determining that a sheet size error has occurred, the controller 1 sets the ink ejection inhibiting value for pixels on the one side of the pixel corresponding to the one side edge pixel in the mask data 9, and for pixels on the other side of the pixel corresponding to the other sidemost sheet reading pixel 71 in the read image data 7, in the mask data 9. When determining that a sheet size error has occurred, the controller 1 can inhibit ink ejection to the entire area where the image sensor 61 cannot detect the paper sheet. Even when a small paper sheet is set in error, ink ejection to the outside of the paper sheet can be prevented. Ink stains in the apparatus can be avoided.

Variation

Figure 12:
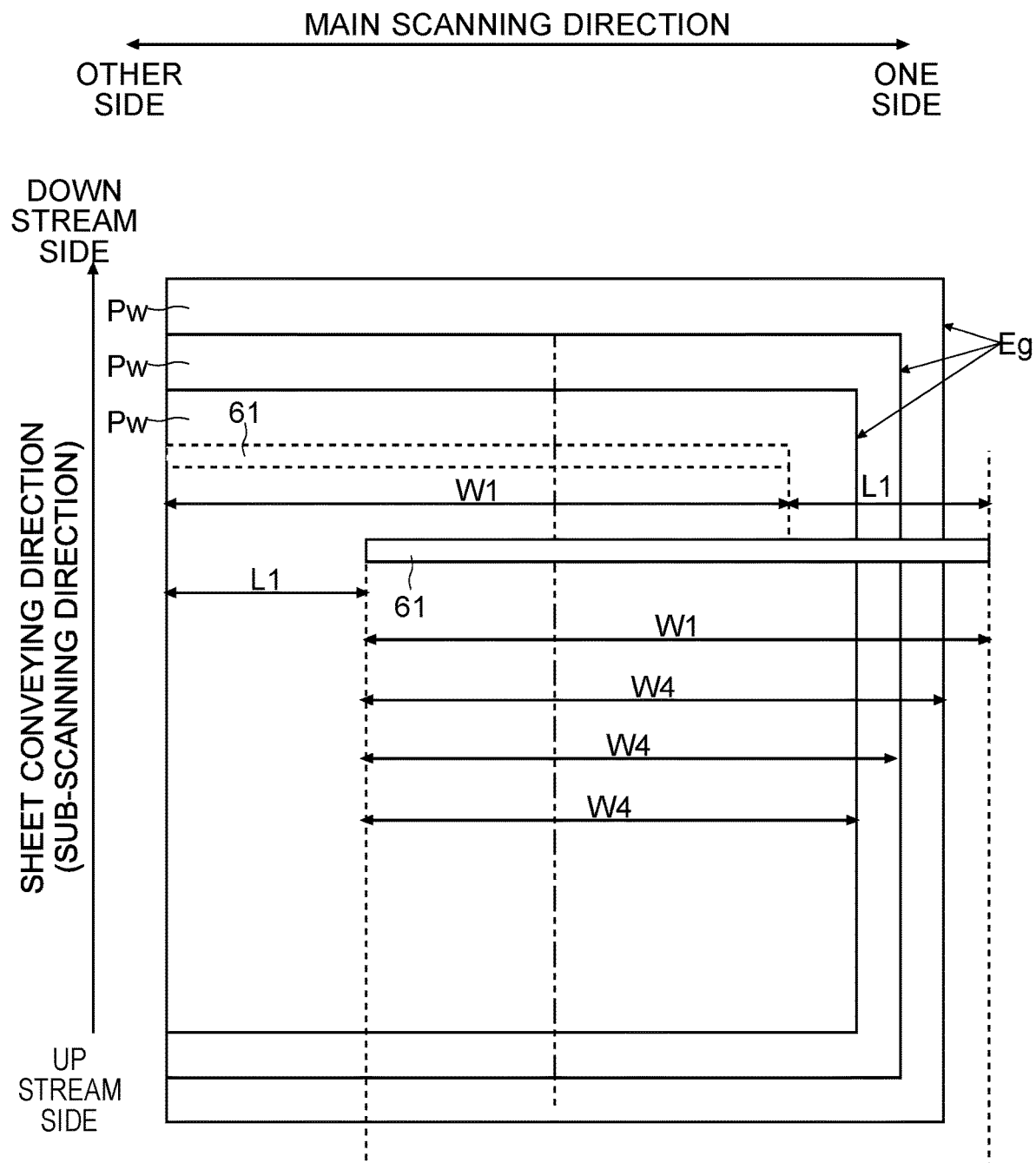
FIG. 12 is a diagram for explaining one example of recognition of deviation of a large width sheet according to a variation.

Next, with reference to FIG. 12, the image forming apparatus 100 according to a variation is described. The above embodiment describes one example of the image forming apparatus 100 that performs the center sheet passing. In the variation, one example of the image forming apparatus 100 that performs side aligned sheet passing is described. The sheet feeder 100a of the image forming apparatus 100 of the variation performs side aligned sheet feeding for any size of paper sheets, in which the paper sheet is fed in such a manner that the end thereof in the main scanning direction is aligned. Further, the sheet feeder 100a and the sheet conveyor 4a (the registration roller pair 41, the conveyor belt 45, and the like) of the image forming apparatus 100 of the variation conveys the paper sheet in such a manner that the end thereof in the main scanning direction is aligned (side aligned sheet conveyance).

FIG. 12 illustrates an example of performing the side aligned sheet passing, in which the image forming apparatus 100 of the variation aligns the end of the paper sheet on the other side (the opposite side to the one side in the main scanning direction). In FIG. 12, a broken line rectangle shows one example of the image sensor 61 at the reference position. In the case of the side aligned sheet passing, the reference position of the image sensor 61 may be a position where the other side end of the reading width W1 coincides with the other side end of the paper sheet.

Also in the variation, the reading width W1 of the image sensor 61 in the main scanning direction is smaller than the short side width of the large width sheet Pw. Further, the reading width W1 of the image sensor 61 in the main scanning direction is larger than the width of the predetermined reference paper sheet Pr size. Also in the variation, the reading width W1 of the image sensor 61 is smaller than the short side of the largest paper sheet Pm and is larger than the long side of the reference paper sheet Pr size. Note that FIG. 12 illustrates the example having three types of the large width sheet Pw.

Also in the case of the variation (the side aligned sheet passing), if the conveyed paper sheet is the large width sheet Pw, the image sensor 61 at the reference position cannot read the one side edge Eg of the large width sheet Pw. Therefore, when the large width sheet Pw is conveyed, the controller 1 controls the moving mechanism 8 to move the image sensor 61 in the main scanning direction. In FIG. 12, one example of the moved position of the image sensor 61 is shown by a solid line rectangle. The controller 1 controls the moving mechanism 8 to move the image sensor 61 from the reference position toward the one side. The controller 1 enables to read the one side edge Eg of the large width sheet Pw in the main scanning direction. Note that after the print job is finished, the controller 1 controls the moving mechanism 8 to move the image sensor 61 toward the other side. The controller 1 returns the image sensor 61 to the reference position.

Also in the case of the variation (the side aligned sheet passing), the movement distance L1 (the movement amount) of the image sensor 61 in the main scanning direction is determined in advance. The movement distance L1 is constant regardless of a size of the large width sheet Pw. For instance, the controller 1 moves the image sensor 61 so that the one side end thereof is positioned on the one side of the one side end of the largest paper sheet Pm without a position deviation. The movement distance L1 is set to any value between 1 cm and 5 cm, for example.

A position of the large width sheet Pw in the main scanning direction may be deviated in the sheet feeding process or the sheet conveying process. Also in the case of the variation (the side aligned sheet passing), on the basis of the read image data 7, the controller 1 recognizes the deviation direction and the deviation amount of the large width sheet Pw in the main scanning direction. Also in the case of the variation, the controller 1 determines the deviation direction and the deviation amount on the basis of the detection use area R0 in the read image data 7.

The controller 1 recognizes the sheet reading pixels 71 and the non-sheet pixels 72, for each of the line data in the main scanning direction (the main scanning line data) in the detection use area R0. Further, the controller 1 recognizes the position of the one sidemost sheet reading pixel 71 (the high density pixel) in each main scanning line data. The one sidemost sheet reading pixel 71 indicates the side edge (the edge Eg) on the one side of the large width sheet Pw. The controller 1 recognizes the one side edge pixel in the sheet reading pixels 71 for each main scanning line data. The one side edge pixel is the sheet reading pixel 71 indicating the one side end of the paper sheet in the main scanning direction.

For each main scanning line data in the detection use area R0, the controller 1 multiplies the number of pixels from the other side end to the one side edge pixel in the main scanning direction by the pitch of one pixel, so as to calculate a length. The controller 1 calculates the average value of the length calculated for each main scanning line data in the detection use area R0, as the read paper sheet width W4. The controller 1 determines the read paper sheet width W4 as the distance from the other side end to the one side edge Eg of the large width sheet Pw in the main scanning direction, in the read image data 7. FIG. 12 shows one example of the read paper sheet width W4 by a solid line arrow.

The controller 1 compares the determined read paper sheet width W4 with the expected value W5. Also in the variation, the expected value W5 is determined in advance. The storage medium 2 stores the expected value W5 in a nonvolatile manner (see FIG. 2). The controller 1 refers to the expected value W5 stored in the storage medium 2. When there are a plurality of types of the large width sheet Pw, the expected value W5 is determined for each of the types (sizes) of the large width sheet Pw. The expected value W5 is the read paper sheet width W4 when there is no position deviation in the main scanning direction. In the variation, the expected value W5 is a distance from the light receiving element on the other side end of the image sensor 61 to the one side edge Eg of the large width sheet Pw. On the basis of a result of measurement, the expected value W5 can be determined in advance.

The absolute value of the difference between the read paper sheet width W4 and the expected value W5 indicates the deviation amount of the large width sheet Pw in the main scanning direction. The controller 1 determines the absolute value of the difference between the expected value W5 and the determined read paper sheet width W4, as the deviation amount. On the basis of a large or small relationship between the read paper sheet width W4 and the expected value W5, the deviation direction can be recognized. The controller 1 recognizes the deviation direction on the basis of the large or small relationship between the expected value W5 and the determined read paper sheet width W4. The controller 1 subtracts the expected value W5 from the read paper sheet width W4. When the difference calculated by the subtraction is positive, the controller 1 determines that the large width sheet Pw (the conveyed paper sheet) is shifted to the one side in the main scanning direction. When the calculated difference is negative, the controller 1 determines that the large width sheet Pw (the conveyed paper sheet) is shifted to the other side in the main scanning direction. The controller 1 shifts the ink ejection position of the line head 49 by the recognized deviation amount in the recognized deviation direction. Specifically, the controller 1 shifts the image data to be supplied to the line head 49 in the main scanning direction, so as to adjust the printing position.

Further, also in the variation, the controller 1 checks whether or not the deviation amount is larger than the upper limit value A1. Also in the variation, the upper limit value A1 is determined in advance. In the side aligned sheet passing of the variation, the position difference of the one side edge Eg between different paper sheet sizes becomes larger than that in the case where the center sheet passing is performed. Therefore, in the variation, the upper limit value A1 can be larger than that in the embodiment. It is possible to determine more precisely that the paper sheet size is not correct (the sheet size error).

In the image forming apparatus 100 according to the variation, the sheet feeder 100a performs the side aligned sheet feeding in which any size of paper sheet is fed in such a manner that the other side thereof opposite to the one side in the main scanning direction is aligned. The sheet conveyor 4a performs the side aligned sheet conveyance in which the paper sheet is conveyed in such a manner that the end thereof in the main scanning direction is aligned. By aligning the end of the paper sheet at the other side, the position difference of the one side edge Eg between different paper sheet sizes becomes larger than that in the case of performing the center sheet passing. The sheet size error can be recognized more precisely.

What is claimed is:

1. An image forming apparatus comprising:
   a sheet feeder for feeding a paper sheet;
   a sheet conveyor for conveying the paper sheet fed from the sheet feeder;
   a line head including a plurality of nozzles aligned in a main scanning direction perpendicular to a sheet conveying direction, so as to eject ink for printing from the nozzles to the conveyed paper sheet;
   one image sensor disposed on an upstream side of the line head in the sheet conveying direction, so as to read the conveyed paper sheet in the main scanning direction, the image sensor having a reading width in the main scanning direction larger than a main scanning direction width of a predetermined reference paper sheet out of printable size paper sheets but smaller than a main scanning direction width of a largest paper sheet out of the printable size paper sheets;
   a moving mechanism including a moving motor, for moving the image sensor in the main scanning direction; and
   a controller, wherein
   in setting for using a large width sheet having a main scanning direction width larger than the reading width, at a start of a print job, the controller controls the moving mechanism to move the image sensor from a predetermined reference position toward one side in the main scanning direction, so that an edge on the one side out of edges of the large width sheet can be read,
   based on read image data obtained by reading by the image sensor, the controller recognizes a deviation direction and a deviation amount of a position of the conveyed large width sheet in the main scanning direction, and
   after an end of the print job, the controller controls the moving mechanism to move the image sensor toward another side to return the image sensor to the reference position.

2. The image forming apparatus according to claim 1, wherein
   in setting for sing the large width sheet, the controller determines a read paper sheet width, which is a distance from a pixel on the other side end opposite to the one side in the main scanning direction to the one side edge of the large width sheet, in the read image data,
   the controller recognizes the deviation direction based on a large or small relationship between the determined read paper sheet width and an expected value, which is a read paper sheet width of the large width sheet without a position deviation in the main scanning direction, and
   the controller recognizes the deviation amount based on a difference between the expected value and the determined read paper sheet width.

3. The image forming apparatus according to claim 2, wherein
   the reference position is a position in which the center of the reading width in the main scanning direction coincides with the center of the conveyed paper sheet in the main scanning direction without a position deviation in the main scanning direction, and
   the controller calculates the expected value by adding ½ of the main scanning direction width of the large width sheet to be used and ½ of the reading width, and by subtracting therefrom a movement distance of the image sensor in the main scanning direction.

4. The image forming apparatus according to claim 2, wherein
   the controller recognizes sheet reading pixels, which are pixels in an area where the paper sheet is read, and non-sheet pixels, which are pixels in an area where the paper sheet is not read, in a detection use area having a predetermined length in the sheet conveying direction from a head of the read image data,
   the controller recognizes one side edge pixel that is the sheet reading pixel indicating the one side end of the paper sheet in the main scanning direction, for each line data in the main scanning direction of the detection use area,
   the controller multiplies the number of pixels from the other side end to the one side edge pixel in the main scanning direction of the read image data by a pitch of one pixel, for each line data in the main scanning direction of the detection use area, so as to calculate a length, and
   the controller calculates an average value of the calculated lengths as the read paper sheet width.

5. The image forming apparatus according to claim 1, wherein the controller shifts an ink ejection position of the line head by the recognized deviation amount in the recognized deviation direction.

6. The image forming apparatus according to claim 1, wherein
   the controller generates mask data defining permission or inhibition of ink ejection from the line head,
   the controller recognizes sheet reading pixels, which are pixels in an area where the paper sheet is read, and non-sheet pixels, which are pixels in an area where the paper sheet is not read, in the read image data,
   the controller recognizes one side edge pixel indicating the one side end of the paper sheet in the main scanning direction, in the sheet reading pixels, and
   in setting for using the large width sheet, the controller sets an ink ejection inhibiting value for pixels on the one side of a pixel corresponding to the one side edge pixel in the mask data.

7. The image forming apparatus according to claim 6, wherein in setting for using the large width sheet, the controller sets an ink ejection permitting value for pixels on the other side of the pixel corresponding to the one side edge pixel in the mask data.

8. The image forming apparatus according to claim 1, wherein the controller determines that a sheet size error has occurred when the recognized deviation amount is larger than a predetermined upper limit value.

9. The image forming apparatus according to claim 8, wherein
the controller generates mask data defining permission or inhibition of ink ejection from the line head,
the controller recognizes sheet reading pixels, which are pixels in an area where the paper sheet is read, and non-sheet pixels, which are pixels in an area where the paper sheet is not read, in the read image data,
the controller recognizes one side edge pixel indicating the one side end of the paper sheet in the main scanning direction, in the sheet reading pixels, and
when determining that a sheet size error has occurred, the controller sets an ink ejection inhibiting value for pixels on the one side of a pixel corresponding to the one side edge pixel, and for pixels on the other side of a pixel corresponding to the other sidemost sheet reading pixel in the read image data, in the mask data.

10. The image forming apparatus according to claim 1, wherein
the sheet feeder performs side aligned sheet feeding for any size of paper sheets, in which the paper sheet is fed in such a manner that the end thereof on the other side opposite to the one side in the main scanning direction is aligned, and
the sheet conveyor performs side aligned sheet conveyance, in which the paper sheet is conveyed in such a manner that the end thereof in the main scanning direction is aligned.

11. The image forming apparatus according to claim 1, wherein
the image sensor is moved from the reference position to a position where the image sensor reads the edge on the one side in the main scanning direction, and is then returned to the reference position without being moved a position where the image sensor reads an edge on another side in the main scanning direction out of the edges.

12. The image forming apparatus according to claim 11, wherein
the reference position is a position where a center of the reading width in the main scanning direction coincides with a center, in the main scanning direction, of the conveyed paper sheet without a deviation in the main scanning direction.

13. A method for controlling an image forming apparatus, the method comprising:
feeding a paper sheet;
conveying the fed paper sheet;
using a line head including a plurality of nozzles aligned in a main scanning direction perpendicular to a sheet conveying direction, so as to print by ejecting ink from the nozzles to the conveyed paper sheet;
disposing one image sensor on an upstream side of the line head in the sheet conveying direction;
using the image sensor to read the conveyed paper sheet in the main scanning direction;
setting a reading width of the image sensor in the main scanning direction larger than a main scanning direction width of a predetermined reference paper sheet out of printable size paper sheets but smaller than a main scanning direction width of a largest paper sheet out of the printable size paper sheets;
moving the image sensor in the main scanning direction;
at a start of a print job, moving the image sensor from a predetermined reference position toward one side in the main scanning direction, so that an edge on the one side out of edges of the large width sheet can be read, in setting for using a large width sheet having a main scanning direction width larger than the reading width;
recognizing a deviation direction and a deviation amount of a position of the conveyed large width sheet in the main scanning direction, based on read image data obtained by reading by the image sensor, and
after an end of the print job, moving the image sensor toward another side to return the image sensor to the reference position.

14. The method according to claim 13, wherein
the image sensor is moved from the reference position to a position where the image sensor reads the edge on the one side in the main scanning direction, and is then returned to the reference position without being moved a position where the image sensor reads an edge on another side in the main scanning direction out of the edges.

15. The method according to claim 14, wherein
the reference position is a position where a center of the reading width in the main scanning direction coincides with a center, in the main scanning direction, of the conveyed paper sheet without a deviation in the main scanning direction.

\* \* \* \* \*